(12) United States Patent
Ikeda et al.

(10) Patent No.: US 12,142,170 B2
(45) Date of Patent: Nov. 12, 2024

(54) THREE-DIMENSIONAL-IMAGE DISPLAY DEVICE

(71) Applicant: Wuhan Tianma Micro-Electronics Co., Ltd., Wuhan (CN)

(72) Inventors: Naoyasu Ikeda, Kanagawa (JP); Tetsushi Sato, Kanagawa (JP)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 18/109,023

(22) Filed: Feb. 13, 2023

(65) Prior Publication Data
US 2023/0196954 A1 Jun. 22, 2023

Related U.S. Application Data

(62) Division of application No. 17/557,598, filed on Dec. 21, 2021, now Pat. No. 11,605,321.

(30) Foreign Application Priority Data

Dec. 25, 2020 (JP) ................................. 2020-217579

(51) Int. Cl.
*G09G 3/00* (2006.01)
*G02B 30/24* (2020.01)
(Continued)

(52) U.S. Cl.
CPC ............. *G09G 3/003* (2013.01); *G02B 30/24* (2020.01); *G02F 1/294* (2021.01); *G09G 3/3406* (2013.01);
(Continued)

(58) Field of Classification Search
CPC .... G09G 3/003; G09G 3/3406; G09G 3/3648; G09G 2300/0809; G09G 2310/0202;
(Continued)

(56) References Cited

U.S. PATENT DOCUMENTS 6,525,699 B1 * 2/2003 Suyama ............... H04N 13/366
348/E13.032
10,019,921 B2 * 7/2018 Lim ......................... G09G 3/20
(Continued)

FOREIGN PATENT DOCUMENTS

CN 101978306 A 2/2011
EP 0911796 A1 4/1999
(Continued)

OTHER PUBLICATIONS

Communication dated Apr. 1, 2024 issued by the State Intellectual Property Office of the P.R. China in application No. 202111568295.9.
(Continued)

*Primary Examiner* — Antonio Xavier
(74) *Attorney, Agent, or Firm* — Sughrue Mion, PLLC

(57) ABSTRACT

A three-dimensional-image display device includes a display unit, a variable focus lens unit, and a controller. The display unit sequentially displays a first image displayed by a first image signal and a second image displayed by a second image signal, and that projects a display light of the first image and a display light of the second image. The variable focus lens unit switches the focal lengths for the display lights to respectively form, as virtual images, the first image and the second image on a first display surface and a second display surface. The controller controls, on the basis of a start timing at which writing, of an image signal of a different image, to pixels of the display unit starts, a projecting timing at which the display unit projects the display light of the first image and the display light of the second image.

6 Claims, 18 Drawing Sheets

(51) Int. Cl.
*G02F 1/29* (2006.01)
*G09G 3/34* (2006.01)
*G09G 3/36* (2006.01)

(52) U.S. Cl.
CPC ... *G09G 3/3648* (2013.01); *G09G 2300/0809* (2013.01); *G09G 2310/0202* (2013.01); *G09G 2310/08* (2013.01); *G09G 2320/0257* (2013.01)

(58) Field of Classification Search
CPC ....... G09G 2310/08; G09G 2320/0257; G09G 2310/024; G09G 2310/0243; G09G 3/3614; G09G 3/3666; G02B 30/24; G02B 3/14; G02B 30/25; G02B 30/28; G02F 1/294; H04N 13/327; H04N 13/322; H04N 13/398
See application file for complete search history.

(56) References Cited

U.S. PATENT DOCUMENTS

| | | | | |
|---|---|---|---|---|
| 2004/0239602 | A1* | 12/2004 | Kim | G09G 3/3611 345/87 |
| 2007/0122027 | A1* | 5/2007 | Kunita | G06T 7/593 382/154 |
| 2009/0237576 | A1 | 9/2009 | Nelson et al. | |
| 2009/0244682 | A1* | 10/2009 | Saishu | H04N 13/305 359/463 |
| 2010/0066820 | A1 | 3/2010 | Park et al. | |
| 2010/0231697 | A1 | 9/2010 | Nakahata et al. | |
| 2010/0289970 | A1* | 11/2010 | Watanabe | G02B 27/0172 353/101 |
| 2012/0162172 | A1 | 6/2012 | Lee et al. | |
| 2013/0222540 | A1* | 8/2013 | Tajima | H04N 13/261 348/43 |
| 2017/0371076 | A1* | 12/2017 | Hua | G02F 1/29 |
| 2018/0088386 | A1* | 3/2018 | Enami | G09G 3/3648 |
| 2019/0073970 | A1* | 3/2019 | Liu | G09G 3/3614 |
| 2020/0169719 | A1* | 5/2020 | Li | G02B 30/24 |
| 2021/0335286 | A1* | 10/2021 | Cui | G09G 3/3614 |
| 2021/0356739 | A1* | 11/2021 | Yano | H04N 13/395 |

FOREIGN PATENT DOCUMENTS

| | | |
|---|---|---|
| JP | 03004211 A | 1/1991 |
| JP | 2000-134643 A | 5/2000 |
| JP | 2004-294848 A | 10/2004 |
| JP | 2005-129983 A | 5/2005 |
| JP | 2010217310 A | 9/2010 |
| JP | 2012503218 A | 2/2012 |
| JP | 2012133350 A | 7/2012 |
| JP | 2014014043 A | 1/2014 |
| JP | 2015034831 A | 2/2015 |

OTHER PUBLICATIONS

Japanese Office Action corresponding to Japanese Patent Application No. 2020-217579, dated Sep. 10, 2024.

* cited by examiner

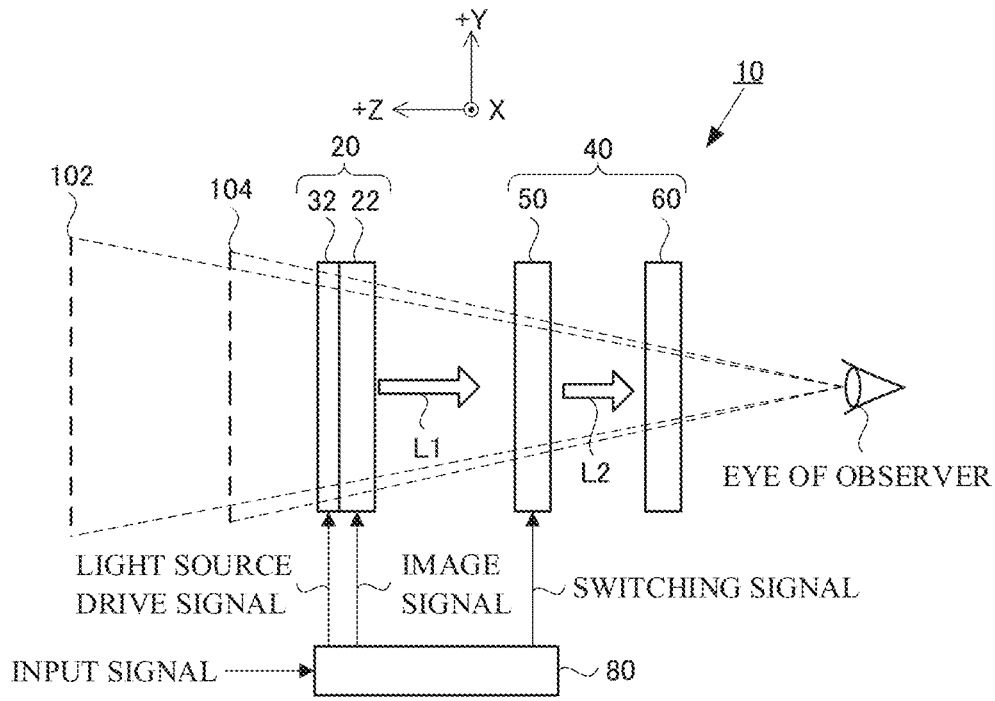
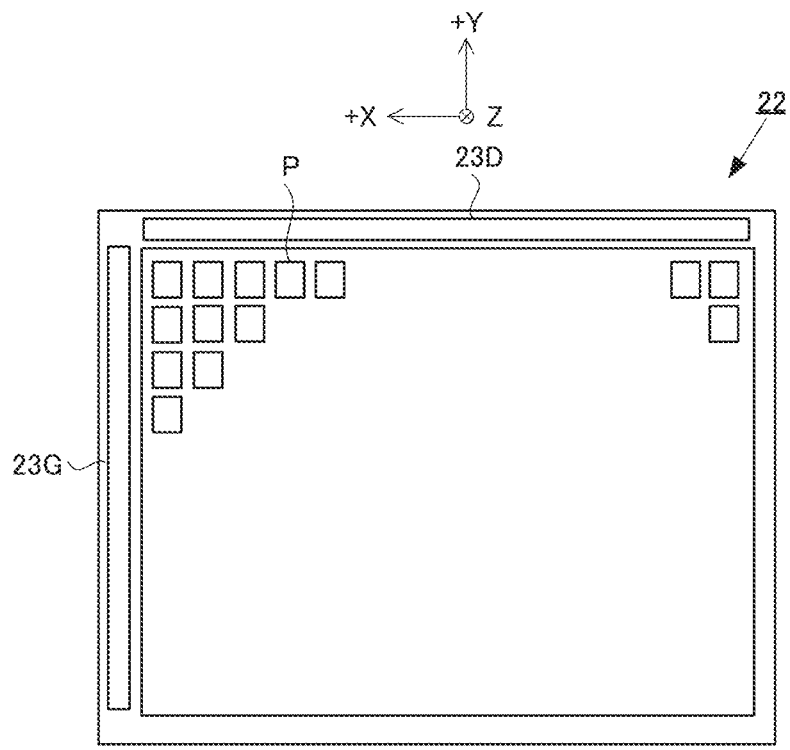

SECOND IMAGE                                                    FIRST IMAGE

THREE-DIMENSIONAL-IMAGE DISPLAY DEVICE

CROSS-REFERENCE TO RELATED APPLICATION

This application is a Divisional of U.S. application Ser. No. 17/557,598 filed Dec. 21, 2021, which claims the benefit of Japanese Patent Application No. 2020-217579, filed on Dec. 25, 2020, the entire disclosure of which is incorporated by reference herein.

FIELD

The present disclosure relates generally to a three-dimensional-image display device.

BACKGROUND

In the related art, depth fused 3D (DFD) type three-dimensional-image display devices are known as display devices that display three-dimensional images (3D images) viewable by the naked eye. For example, Unexamined Japanese Patent Application Publication No. 2005-129983 describes a three-dimensional display device including a display device that alternately displays two two-dimensional images, a polarizing plate that projects output light from the display device as polarized light, a polarization switching device that switches the polarization direction of the output light projected from the polarizing plate, and a polarized bifocal lens.

With the three-dimensional display device of Unexamined Japanese Patent Application Publication No. 2005-129983, the two two-dimensional images are alternately formed on respective display surfaces located at different depth positions from the perspective of an observer, and the brightness or the transmittance of the two two-dimensional images is independently changed to display a three-dimensional image.

With the three-dimensional display device of Unexamined Japanese Patent Application Publication No. 2005-129983, the two two-dimensional images are alternately displayed. Consequently, when crosstalk between the two two-dimensional images occurs, the three-dimensional image may not be displayed at the correct position.

SUMMARY

A three-dimensional-image display device of the present disclosure includes:
  a display unit that sequentially displays a first image displayed by a first image signal and a second image displayed by a second image signal, and that projects display light of the first image and a display light of the second image;
  a variable focus lens unit that switches between a focal distance for the display light of the first image and a focal distance for the display light of the second image; and
  a controller that controls a projection timing at which the display unit projects the display light of the first image and the display light of the second image, wherein
  the first image and the second image are two-dimensional images obtained by projecting, from a side of an observer, a display subject on each of a first display surface and a second display surface positioned at different positions in a depth direction from a perspective of the observer,
  the variable focus lens unit forms each of the first image and the second image as a virtual image on each of the first display surface and the second display surface, and
  the controller controls the projection timing based on a start timing at which writing, of an image signal of a different image, to a pixel of the display unit starts.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which:
FIG. 1 is a schematic drawing illustrating a three-dimensional-image display device according to Embodiment 1;
FIG. 2 is a plan view illustrating a liquid crystal display panel according to Embodiment 1.

FIG. 22A is a drawing illustrating polarity inversion of the voltage written to pixels by frame inversion driving according to Embodiment 5;

FIG. 22B is a drawing illustrating polarity inversion of the voltage written to pixels by frame inversion driving according to Embodiment 5;

FIG. 22C is a drawing illustrating polarity inversion of the voltage written to pixels by frame inversion driving according to Embodiment 5;

FIG. 22D is a drawing illustrating polarity inversion of the voltage written to pixels by frame inversion driving according to Embodiment 5;

FIG. 22E is a drawing illustrating polarity inversion of the voltage written to pixels by pixel inversion driving according to Embodiment 5;

FIG. 22F is a drawing illustrating polarity inversion of the voltage written to pixels by pixel inversion driving according to Embodiment 5;

FIG. 22G is a drawing illustrating polarity inversion of the voltage written to pixels by pixel inversion driving according to Embodiment 5;

FIG. 22H is a drawing illustrating polarity inversion of the voltage written to pixels by pixel inversion driving according to Embodiment 5;

DETAILED DESCRIPTION

Figure 3:
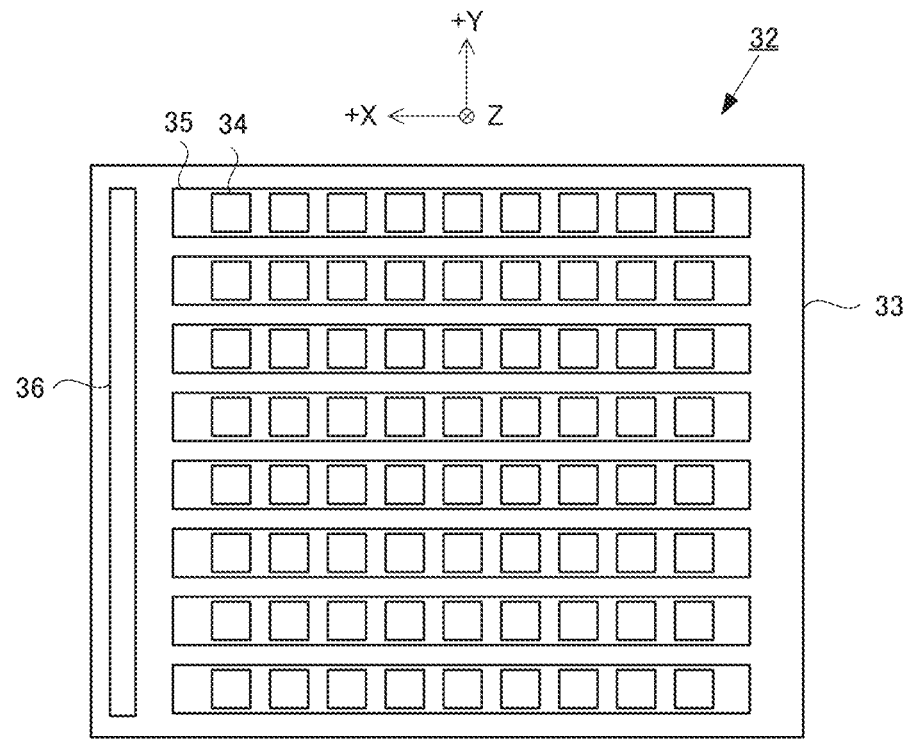
FIG. 3 is a schematic drawing illustrating a light source according to Embodiment 1.

Hereinafter, a three-dimensional-image display device according to various embodiments is described while referencing the drawings.

Embodiment 1

A three-dimensional-image display device 10 according to the present embodiment is described while referencing FIGS. 1 to 8. The three-dimensional-image display device 10 is display device that displays three-dimensional images by depth fused 3D (DFD). In one example, the three-dimensional-image display device 10 is combined with eyepieces, and is used as a head-mounted display. Note that, in the present embodiment, an example of a three-dimensional-image display device 10 that uses a monochrome liquid crystal panel is described.

Overall Configuration

Firstly, the overall configuration of the three-dimensional-image display device 10 is described. As illustrated in FIG. 1, the three-dimensional-image display device 10 includes a display unit 20, a variable focus lens unit 40, and a controller 80.

The display unit 20 sequentially displays a first image and a second image in time divisions. In the present embodiment, the display unit 20 projects display light L1 of the first image and the second image as polarized light. The polarization direction of the polarized light is a predetermined first direction. The variable focus lens unit 40 switches between a focal length for the display light L1 of the first image and a focal length for the display light L1 of the second image to respectively form, as virtual images, the first image and the second image on a first display surface 102 and a second display surface 104. In the present embodiment, the variable focus lens unit 40 includes a polarization switching unit 50 and a polarized bifocal lens 60. The polarization switching unit 50 projects while switching the polarization direction of the display light L1 projected from the display unit 20 between the predetermined first direction and a predetermined second direction. The polarized bifocal lens 60 is a lens for which the focal distance, for the output light projected from the polarization switching unit 50, differs depending on the polarization direction of the output light. The controller 80 controls a projection timing at which the display unit 20 projects the display light L1. Additionally, the controller 80 supplies, to the display unit 20, a first image signal for displaying the first image and a second image signal for displaying the second image. Furthermore, the controller 80 controls the switching of the polarization direction of the polarization switching unit 50.

In the present description, to facilitate comprehension, in the three-dimensional-image display device 10 of FIG. 1, the left direction (the left direction on paper) is referred to as the "+Z direction", the up direction (the up direction on paper) is referred to as the "+Y direction", and the direction perpendicular to the +Y direction and the +Z direction (the front direction on paper) is referred to as the "+X direction." Additionally, the first image signal for displaying the first image and the second image signal for displaying the second image are collectively referred to as "image signals."

The display unit 20 of the three-dimensional-image display device 10 includes a liquid crystal display panel 22 and a light source 32. The liquid crystal display panel 22 of the display unit 20 modulates, on the basis of the first image signal for displaying the first image and the second image signal for displaying the second image supplied from the controller 80, light emitted from the light source 32, thereby sequentially displaying the first image and the second image in time divisions. The liquid crystal display panel 22 projects the display light L1 of the images (for example, the first image and the second image) as polarized light. The polarization direction of the polarized light is a predetermined first direction. The display light L1 projected from the liquid crystal display panel 22 enters the polarization switching unit 50. In the present embodiment, the predetermined first direction is the X direction.

The first image and the second image are two-dimensional images obtained by projecting, from the side of the observer, a display subject on each of the first display surface 102 and the second display surface 104 that are positioned at different positions in a depth direction (the +Z direction) from the perspective of the observer. The first display surface 102 and the second display surface 104 are described later.

In one example, the liquid crystal display panel 22 is implemented as a transmissive twisted nematic (TN) liquid crystal display that is active matrix driven by a thin film transistor (TFT). As illustrated in FIG. 2, the liquid crystal display panel 22 includes pixels P arranged in a matrix, a gate driver 23G, and a data driver 23D. The gate driver 23G sequentially selects the pixels P by row, and performs line progressive scanning in the −Y direction. The data driver 23D supplies, to each of the selected pixels P, a voltage corresponding to an image signal, thereby writing the image signal to each of the pixels P. Note that FIG. 2 illustrates only a portion of the pixels P arranged in the matrix. Additionally, the liquid crystal display panel 22 includes a polarizing plate, a liquid crystal, and the like.

The light source 32 of the display unit 20 emits light intermittently on the liquid crystal display panel 22 on the basis of a light source drive signal that is supplied from the controller 80 and is synchronized with the image signals. The controller 80 supplies the light source drive signal to the light source 32 to control a light emission timing t30 at which the light source 32 emits light, thereby controlling the projection timing at which the display unit 20 projects the display light L1. The light source drive signal and the light emission timing t30 at which the light source 32 emits light are discussed later.

In one example, the light source 32 is implemented as a direct backlight that is provided on a back surface of the liquid crystal display panel 22. As illustrated in FIG. 3, the light source (backlight) 32 includes a housing 33, a plurality of light emitting diode (LED) elements 34, and a driver circuit 36. Additionally, the light source 32 includes a reflecting sheet, a diffusing sheet, and the like that are non-illustrated.

The housing 33 houses the LED elements 34, the driver circuit 36, and the like. The LED elements 34 emit white light. The LED elements 34 are mounted on mounting boards 35, and are connected in series in the row direction (the +X direction) of the pixels P of the liquid crystal display panel 22. The mounting boards 35 are arranged along the line progressive scanning direction (the −Y direction) of the liquid crystal display panel 22, and are connected to the driver circuit 36. The driver circuit 36 supplies current to the LED elements 34 on the basis of the light source drive signal, thereby causing the LED elements 34 to emit light. In the present embodiment, the driver circuit 36 causes all of the LED elements 34 to emit light at once on the basis of the light source drive signal. Accordingly, with the light source 32 of the present embodiment, the entire surface of the light source 32 emits light at the same timing. That is, the display light L1 is projected from the entire surface of the display unit 20 at the same timing.

The polarization switching unit 50 of the three-dimensional-image display device 10 switches, on the basis of a switching signal that is supplied from the controller 80 and is synchronized with the image signals, the polarization direction of the display light L1 projected from the display unit 20 between the predetermined first direction (the X direction) and a predetermined second direction. In the present embodiment, the predetermined second direction is the Y direction. Specifically, when the first image is being displayed on the liquid crystal display panel 22 of the display unit 20, the polarization switching unit 50 maintains the polarization direction of the incident display light L1 in the X direction and projects. When the second image is being displayed on the liquid crystal display panel 22 of the display unit 20, the polarization switching unit 50 switches the polarization direction of the incident display light L1 to the Y direction and projects.

Figure 4:
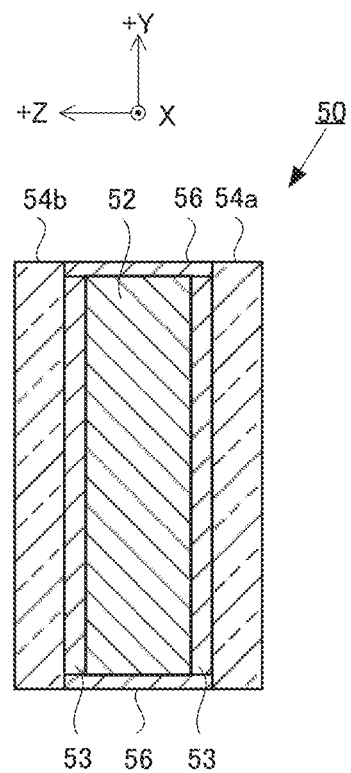
FIG. 4 is a cross-sectional view illustrating a polarization switching unit according to Embodiment 1.

In one example, the polarization switching unit 50 is implemented as a TN liquid crystal element that has a twist angle of 90°. As illustrated in FIG. 4, the polarization switching unit (the TN liquid crystal element) 50 includes a liquid crystal 52, two light-transmitting substrates 54a and 54b that include an electrode 53 that applies voltage to the liquid crystal 52, and an alignment film (not illustrated) that aligns the liquid crystal 52. Here, the two light-transmitting substrates 54a and 54b sandwich the liquid crystal 52. The light-transmitting substrate 54a and the light-transmitting substrate 54b are adhered to each other by a sealing material 56. When an OFF level switching signal is supplied, the polarization switching unit 50 rotates the polarization direction of the display light L1 90°, and projects a display light L2. The polarization direction of the display light L2 is the Y direction. When an ON level switching signal is supplied to the polarization switching unit 50, the liquid crystal 52 is aligned perpendicularly to the light-transmitting substrates 54a and 54b, and the polarization switching unit 50 projects the display light L2 while maintaining the polarization direction of the display light L1 in the X direction. The display light L2 projected from the polarization switching unit 50 enters the polarized bifocal lens 60. The switching signal is described later.

The polarized bifocal lens 60 of the three-dimensional-image display device 10 is a lens for which the focal distance for the display light L2 projected from the polarization switching unit 50, differs depending on the polarization direction (the X direction and the Y direction) of the display light L2. The polarized bifocal lens 60 forms each of the first image and the second image as a virtual image from the perspective of the observer on each of the first display surface 102 and the second display surface 104. The first display surface 102 and the second display surface 104 are imaginary display surfaces positioned at different positions in the depth direction (the +Z direction) from the perspective of the observer. In the present embodiment, as illustrated in FIG. 1, from the perspective of the observer, the first display surface 102 and the second display surface 104 are positioned farther away than the display unit 20. Additionally, the second display surface 104 is positioned more to the observer side (the −Z side) than the first display surface 102.

The observer views the virtual image of the first image on the first display surface 102 and the virtual image of the second image on the second display surface 104 that are sequentially displayed in time divisions, and recognizes that the display subject is positioned between the first display surface 102 and the second display surface 104. The position of the display subject that the observer recognizes can be changed by adjusting the brightness (for example, the luminance) ratio of the first image to the second image. For example, when the brightness ratio of the first image to the second image is 1:1, the observer recognizes that the display subject is positioned between the first display surface 102 and the second display surface 104.

Figure 5:
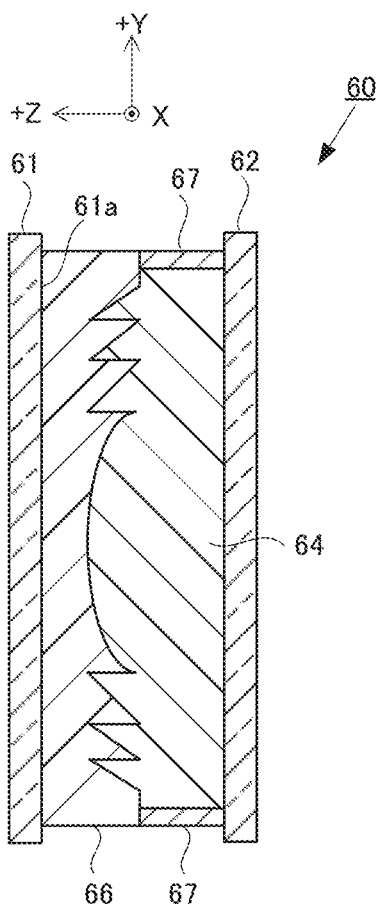
FIG. 5 is a cross-sectional view illustrating a polarized bifocal lens according to Embodiment 1.

In one example, the polarized bifocal lens 60 is implemented as a liquid crystal lens. As illustrated in FIG. 5, the polarized bifocal lens (the liquid crystal lens) 60 includes a first light-transmitting substrate 61, a second light-transmitting substrate 62, and a liquid crystal 64.

In one example, the first light-transmitting substrate 61 and the second light-transmitting substrate 62 are implemented as glass substrates. The first light-transmitting substrate 61 includes a resin fresnel lens 66 on a first main surface 61a that faces the second light-transmitting substrate 62. The first light-transmitting substrate 61 and the second light-transmitting substrate 62 are adhered to each other by a sealing material 67. The first light-transmitting substrate 61 and the second light-transmitting substrate 62 sandwich the liquid crystal 64. In one example, the liquid crystal 64 is implemented as a nematic liquid crystal that has positive refractive index anisotropy ($\Delta n = ne - no > 0$, where $ne$ is the refractive index of the extraordinary ray, and $no$ is the refractive index of the ordinary ray). The liquid crystal 64 is aligned in the X direction by a non-illustrated alignment film.

When the display light L2 of the first image, which has the X direction as the polarization direction, enters the polarized bifocal lens 60, the nematic liquid crystal that has positive refractive index anisotropy is aligned with the X direction and, as such, the focal distance of the polarized lens 60 for the display light L2 is short, and the first image is formed on the first display surface 102. When the display light L2 of the second image, which has the Y direction as the polarization direction, enters the polarized bifocal lens 60, the focal distance of the polarized bifocal lens 60 for the display light L2 is long, and the second image is formed on the second display surface 104.

Figure 6:
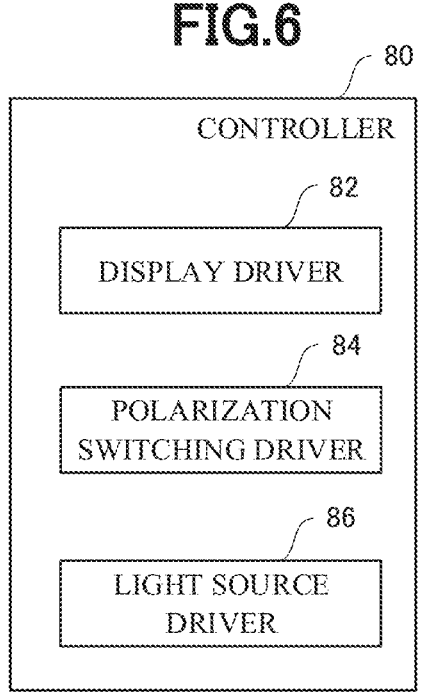
FIG. 6 is a block diagram illustrating a controller according to Embodiment 1.

The controller 80 of the three-dimensional-image display device 10 controls the display unit 20 and the polarization switching unit 50 on the basis of input signals input from a non-illustrated external device. As illustrated in FIG. 6, the controller 80 includes a display driver 82, a polarization switching driver 84, and a light source driver 86.

The display driver 82 of the controller 80 generates, from the input signals, the first image signal for displaying the first image and the second image signal for displaying the second image. Additionally, the display driver 82 supplies the image signals to the liquid crystal display panel 22. Furthermore, the display driver 82 supplies, to the polarization switching driver 84 and the light source driver 86, a synchronization signal that synchronizes the start of supplying of the image signals (that is, start timings at which writing of the image signals is started).

The polarization switching driver 84 of the controller 80 generates a switching signal on the basis of the synchronization signal supplied from the display driver 82. Additionally, the polarization switching driver 84 supplies the generated switching signal to the polarization switching unit 50. In the present embodiment, when the first image is displayed on the liquid crystal display panel 22, the polarization switching driver 84 sets the switching signal to the ON level and supplies the switching signal to the polarization switching unit 50.

The light source driver 86 of the controller 80 generates the light source drive signal on the basis of the synchronization signal supplied from the display driver 82. Additionally, the light source driver 86 supplies the generated light source drive signal to the driver circuit 36 of the light source 32. In the present embodiment, when an image signal different from the already-written image signal is to be written, the light source driver 86 generates and supplies the light source drive signal to the light source 32.

Figure 7:
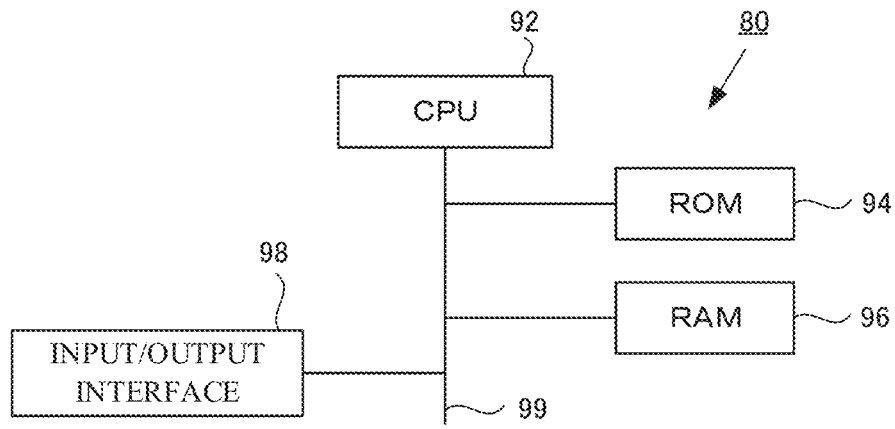
FIG. 7 is a drawing illustrating the hardware configuration of the controller according to Embodiment 1.

FIG. 7 illustrates the hardware configuration of the controller 80. The controller 80 includes a central processing unit (CPU) 92, a read-only memory (ROM) 94, a random access memory (RAM) 96, and an input/output interface 98. The CPU 92, the ROM 94, the RAM 96, and the input/output interface 98 are connected to a bus 99. The CPU 92 executes various types of processings. The ROM 94 stores programs and data. The RAM 96 stores data. The input/output interface 98 inputs and outputs signals between the CPU 92, and the liquid crystal display panel 22, the light source 32, the polarization switching unit 50, and the external device. The CPU 92 executes the programs stored in the ROM 94 to realize the functions of the controller 80.

Figure 8:
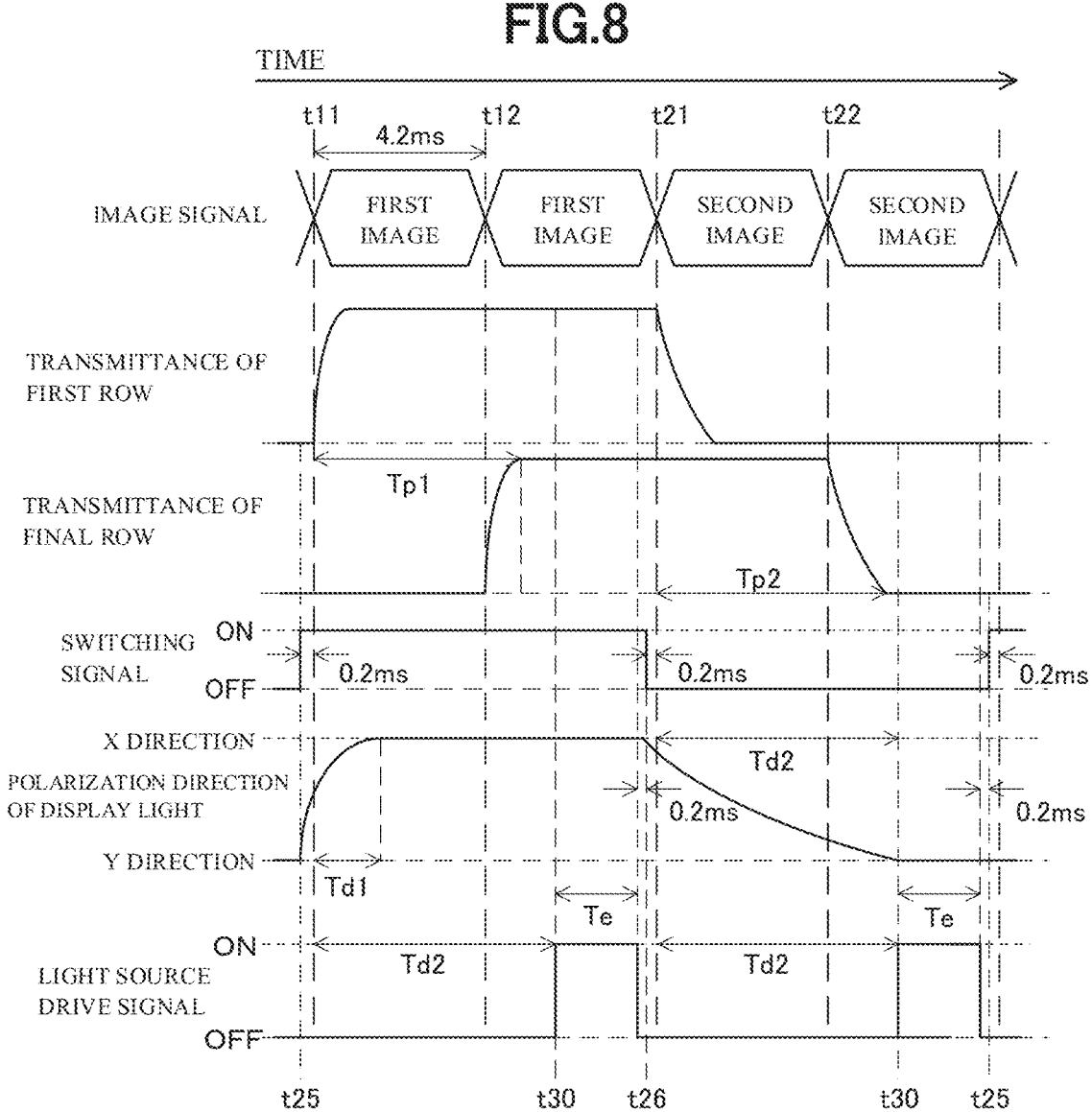
FIG. 8 is a drawing illustrating timings of operations of the three-dimensional-image display device according to Embodiment 1.

Next, the light emission timing t30 of the light source 32 is described. FIG. 8 is a drawing illustrating timings of operations of the three-dimensional-image display device 10. In FIG. 8, the first tier illustrates the image signals (the first image signal and the second image signal) that are input into the liquid crystal display panel 22. The second tier of FIG. 8 illustrates the transmittance of the pixels P of the first row in the line progressive scanning of the liquid crystal display panel 22. The third tier of FIG. 8 illustrates the transmittance of the pixels P of the final row in the line progressive scanning of the liquid crystal display panel 22. The fourth tier of FIG. 8 illustrates the timing of the switching signal. The fifth tier of FIG. 8 illustrates the polarization direction of the display light L2 projected from the polarization switching unit 50. The sixth tier of FIG. 8 illustrates the timing of the light source drive signal.

In the present embodiment, the display driver 82 supplies the image signals to the liquid crystal display panel 22 on a 240 Hz cycle (period of one frame: 4.2 ms). The liquid crystal display panel 22 performs the line progressive scanning (that is, the writing to the pixels P) on a 240 Hz cycle. Additionally, as illustrated in the first tier of FIG. 8, the display driver 82 supplies the same image signal two consecutive times to the liquid crystal display panel 22. The liquid crystal display panel 22 sequentially displays the first image and the second image. In FIG. 8, the writing of the first image starts from the timings t11 and t12. Then, the writing of the second image starts from the timings t21 and t22.

Accordingly, as illustrated in the second and third tiers of FIG. 8, the transmittance of the pixels P of the first row of the liquid crystal display panel 22 changes from the timing t11 and the timing t21, and the transmittance of the pixels P of the final row of the liquid crystal display panel 22 changes from the timing t12 and the timing t22. The timing t11 corresponds to a start timing at which writing of the first first image starts. The timing t12 corresponds to a start timing at which writing of the second first image starts. The timing t21 corresponds to a start timing at which writing of the first second image starts. The timing t22 corresponds to a start timing at which writing of the second second image starts.

In the present embodiment, as illustrated in the fourth tier of FIG. 8, the polarization switching driver 84 supplies an ON level switching signal to the polarization switching unit 50 in a period from a timing t25 that is 0.2 ms before the timing t11 of the writing start of the first first image to a timing t26 that is 0.2 ms before the timing t21 of writing start of the first second image. Due to this, as illustrated in the fifth tier of FIG. 8, from the timing t25, the polarization direction of the display light L2 projected from the polarization switching unit 50 switches from the Y direction to the X direction. Additionally, from the timing t26, the polarization direction of the display light L2 projected from the polarization switching unit 50 switches from the X direction to the Y direction.

The light source driver 86 sets the light emission timing t30 on the basis of the start timing at which the writing of the image signal of a different image starts. In the present embodiment, the timing t11 and the timing t21 correspond to the start timings at which the writing of the image signal of a different image starts. In the following, the start timings at which the writing of the image signal of a different image starts are referred to as "different image start timings t11 and t21."

In the present embodiment, the light source driver 86 sets the light emission timing t30 to timings at which an amount of time that ends latest after the different image start timings t11 and t21, among the switching of the polarization direction of the display light L2 of the polarization switching unit 50, the response to the first image signal of the pixels P of the liquid crystal display panel 22, and the response to the second image signal of the pixels P of the liquid crystal display panel 22, has elapsed from the different image start timings t11 and t21. The switching of the polarization direction of the display light L2 of the polarization switching unit 50 corresponds to the switching of the focal distance for the display light L2 of the first image and the focal distance for the display light L2 of the second image of the variable focus lens unit 40.

Specifically, when Td1 and Td2 are respectively amounts of time from the different image start timings t11 and t21 until the switching of the polarization direction of the display light L2 of the polarization switching unit 50 ends, Tp1 is an amount of time from the different image start timing t11 until the response to the first image signal of the pixels P of the liquid crystal display panel 22 ends, and Tp2 is an amount of time from the different image start timing t21 until the response to the second image signal of the pixels P of the liquid crystal display panel 22 ends, the amount of time Td2 is the longest as illustrated in FIG. 8. Accordingly, as illustrated in the sixth tier of FIG. 8, the light source driver 86 sets the light emission timing t30 to timings at which the amount of time Td2 has elapsed from the different image start timings t11 and t21. As a result, the response of the pixels P of the final row of the liquid crystal display panel 22 ends, next, the polarization direction of the display light L2 changes and, thereafter, the light source 32 emits light. Accordingly, mixing of the first image displayed by the first image signal and the second image displayed by the second image signal can be prevented. Note that, in the present embodiment and the following embodiments, the phrase "until the response of the pixels P of the liquid crystal display panel 22 ends" refers to "until the transmittance or brightness of the pixels P reach 99% of a target value". The phrase "until the switching of the polarization direction of the display light L2 of the polarization switching unit 50 end" refers to "until the polarization direction of the display light L2 reach 99% of a target direction". For example, when displaying an (black) image having 0% transmittance from an (white) image having 100% transmittance, the phrase "until displaying ends" means "until transmittance reaches 1%".

Additionally, the light source driver 86 sets an emission period Te of the light source 32 to until before the start of the switching of the polarization direction of the polarization switching unit 50. In the present embodiment, the light source driver 86 sets the emission period Te to until 0.2 ms before the start of the switching of the polarization direction of the polarization switching unit 50. Thus, the light source 32 causes all of the LED elements 34 to emit at once from the light emission timing t30 to 0.4 ms before the next different image start timing t11 or t21.

As described above, in the present embodiment, the light emission timing t30 of the light source 32 is set on the basis of the start timings (different image start timings) t11 and t21 at which the writing, to the pixels P of the liquid crystal display panel 22, of an image signal that displays a different image starts. Specifically, the light emission timing t30 of the light source 32 is set to timings at which the amount of time Td2, which lasts the longest after the different image start timings t11 and t21, has elapsed from the different image start timings t11 and t21. Thus, the response of the pixels P of the final row of the liquid crystal display panel 22 ends, next, the polarization direction of the display light L2 changes and, thereafter, the light source 32 emits light. Accordingly, mixing of the first image and the second image can be prevented, and crosstalk between the first image and the second image can be suppressed.

Embodiment 2

In Embodiment 1, the amount of time Td2, which is from the different image start timing t21 to when the switching of the polarization direction of the display light L2 ends, is the longest. In the present embodiment, a description is given of a case in which the amount of time Tp2, which is from the different image start timing t21 to when the response to the second image signal of the pixels P of the liquid crystal display panel 22 ends, is the longest.

In the present embodiment, a lead lanthanum zirconate titanate (PLZT) element is used for the polarization switching unit 50 instead of the TN liquid crystal element of Embodiment 1. Additionally, the timings of the operations of the three-dimensional-image display device 10 differ from Embodiment 1. The other configurations of the three-dimensional-image display device 10 are the same as in Embodiment 1.

Figure 9:
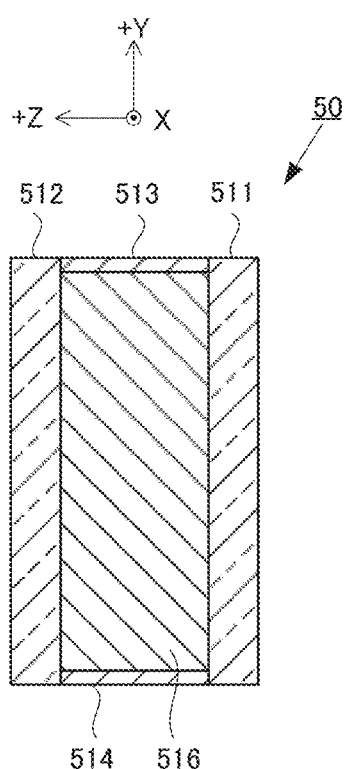
FIG. 9 is a cross-sectional view illustrating a polarization switching unit according to Embodiment 2.

As illustrated in FIG. 9, the polarization switching unit (PLZT element) 50 of the present embodiment includes two light-transmitting substrates 511 and 512, two electrodes 513 and 514, and a PLZT 516. The light-transmitting substrate 511 and the light-transmitting substrate 512 sandwich the PLZT 516. The electrode 513 and the electrode 514 apply voltage to the PLZT 516. The PLZT 516 is implemented as a translucent ferroelectric ceramic element. Typically, PLZT elements can switch the polarization direction of the display light L1 between the X direction and the Y direction at a higher speed than in TN liquid crystal elements (response time of PLZT element: several μm to several hundred μm).

Next, the light emission timing t30 of the light source 32 of the present embodiment is described. Here, differences from the timing of Embodiment 1 are mainly described.

Figure 10:
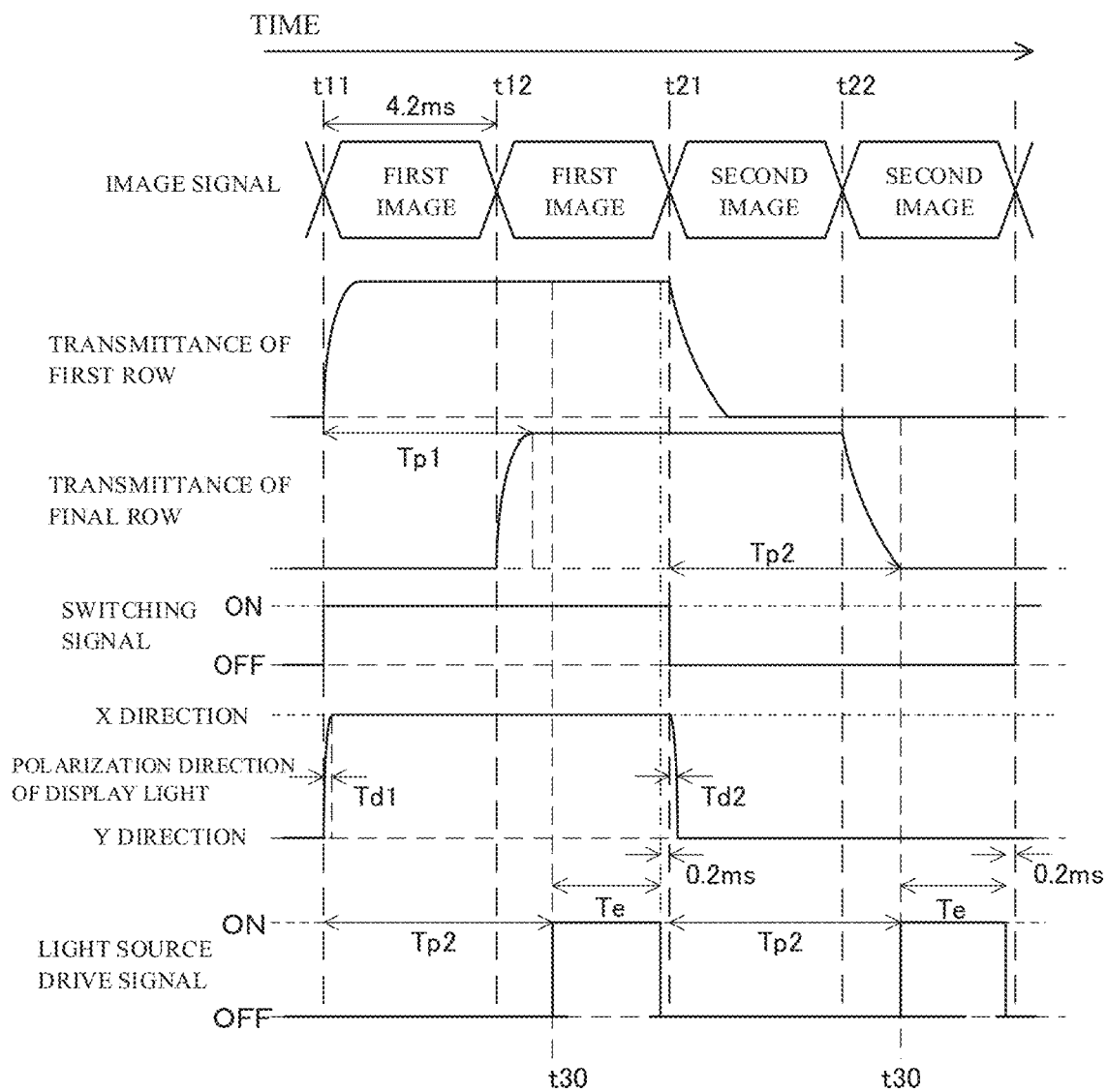
FIG. 10 is a drawing illustrating the timing of operations of the three-dimensional-image display device according to Embodiment 2.

FIG. 10 is a drawing illustrating timings of operations of the three-dimensional-image display device 10 of the present embodiment. In the present embodiment, as illustrated in the fourth tier of FIG. 10, the polarization switching driver 84 supplies the ON level switching signal to the polarization switching unit 50 in a period from the timing t11 of the writing start of the first first image (different image start timing) to the timing t21 of the writing start of the first second image (different image start timing). Due to this, as illustrated in the fifth tier of FIG. 10, from the different image start timing t11, the polarization direction of the display light L2 projected from the polarization switching unit 50 switches from the Y direction to the X direction. Additionally, from the different image start timing t21, the polarization direction of the display light L2 projected from the polarization switching unit 50 switches from the X direction to the Y direction. In the present embodiment, the PLZT element is used for the polarization switching unit 50 and, as such, as illustrated in the fifth tier of FIG. 10, the amounts of time Td1 and Td2 from the different image start timings t11 and t21 until the switching of the polarization direction of the display light L2 ends can be shortened.

In the present embodiment, as illustrated in FIG. 10, of the amounts of time Td1 and Td2 from the different image start timings t11 and t21 until the switching of the polarization direction of the display light L2 of the polarization switching unit 50 ends, the amount of time Tp1 from the different image start timing t11 until the response to the first image signal of the pixels P of the liquid crystal display panel 22 ends, and the amount of time Tp2 from the different image start timing t21 until the response to the second image signal of the pixels P of the liquid crystal display panel 22 ends, the amount of time Tp2 is the longest. Accordingly, as illustrated in the sixth tier of FIG. 10, the light source driver 86 sets the light emission timing t30 to timings at which the amount of time Tp2 has elapsed from the different image start timings t11 and t21. Additionally, the light source driver 86 sets the emission period Te to until before the different image start timings t11 and t21. In the present embodiment, the light source driver 86 sets the emission period Te to until 0.2 ms before the different image start timings t11, t21.

In the present embodiment, the light emission timing t30 is set to the timings at which the amount of time Tp2 has elapsed from the different image start timings t11 and t21 and, as such, the polarization direction of the display light L2 is switched, next, the response to the pixels P of the final row of the liquid crystal display panel 22 ends and, thereafter, the light source 32 emits light. Accordingly, mixing of the first image and the second image can be prevented, and crosstalk between the first image and the second image can be suppressed.

Embodiment 3

In Embodiments 1 and 2, the display light L1 is projected from the entire surface of the display unit 20 at the same timing. In the present embodiment, the display unit 20 of the three-dimensional-image display device 10 sequentially projects the display light L1 by each of a plurality of projection regions. In the present embodiment, a case is described in which the display unit 20 is divided into four projection regions.

As with the three-dimensional-image display device 10 of Embodiment 1, the three-dimensional-image display device 10 of the present embodiment includes a display unit 20, a polarization switching unit 50, a polarized bifocal lens 60, and a controller 80. The configuration of the polarized bifocal lens 60 of the present embodiment is the same as the polarized bifocal lens 60 of Embodiment 1 and, as such, the display unit 20, the polarization switching unit 50, and the controller 80 are described.

Figure 11:
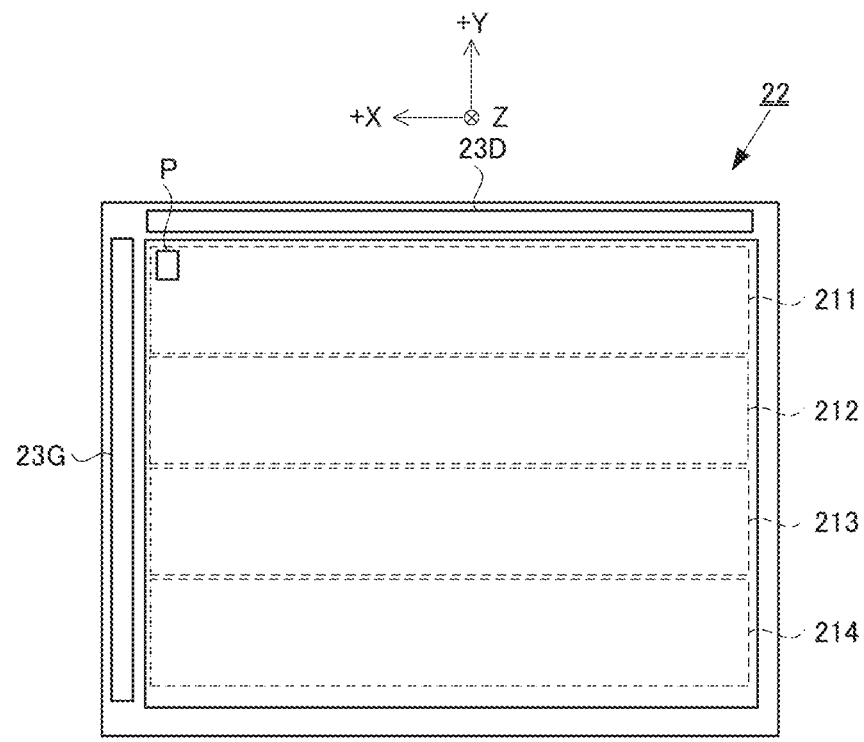
FIG. 11 is a plan view illustrating a liquid crystal display panel according to Embodiment 3.

As with the display unit 20 of Embodiment 1, the display unit 20 of the present embodiment includes a liquid crystal display panel 22 and a light source 32. As illustrated in FIG. 11, the liquid crystal display panel 22 of the present embodiment is divided, in the line progressive scanning direction, into four regions, namely a first display region 211 to a fourth display region 214. The first display region 211 to the fourth display region 214 respectively correspond to four emission regions, namely a first emission region 311 to a fourth emission region 314 of the light source 32, which are described later. The other configurations of the liquid crystal display panel 22 of the present embodiment are the same as the configurations of the liquid crystal display panel 22 of Embodiment 1.

Figure 12:
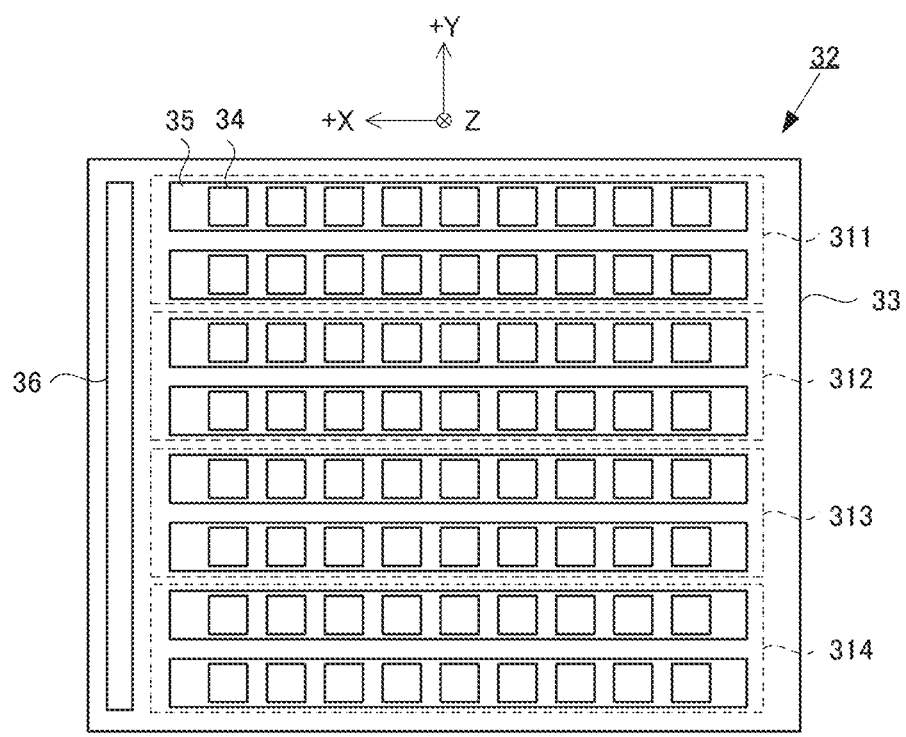
FIG. 12 is a schematic drawing illustrating a light source according to Embodiment 3.

As with the light source 32 of Embodiment 1, the light source 32 of the present embodiment includes a housing 33, a plurality of LED elements 34, and a driver circuit 36. Additionally, the light source 32 includes a reflecting sheet, a diffusing sheet, and the like that are non-illustrated. As illustrated in FIG. 12, the light source 32 of the present embodiment is divided, in the line progressive scanning direction of the liquid crystal display panel 22, into four regions, namely a first emission region 311 to a fourth emission region 314. The driver circuit 36 of the present embodiment causes the LED elements 34 to emit light by each of the first emission region 311 to the fourth emission region 314 on the basis of light source drive signals supplied from the light source driver 86 of the controller 80. In the present embodiment, the first emission region 311 to the fourth emission region 314 respectively correspond to the first display region 211 to the fourth display region 214 of the liquid crystal display panel 22 and, as such, the display unit 20 projects the display light L1 by each of the first emission region 311 to the fourth emission region 314. The first emission region 311 to the fourth emission region 314 correspond to projection regions of the display unit 20.

Figure 13:
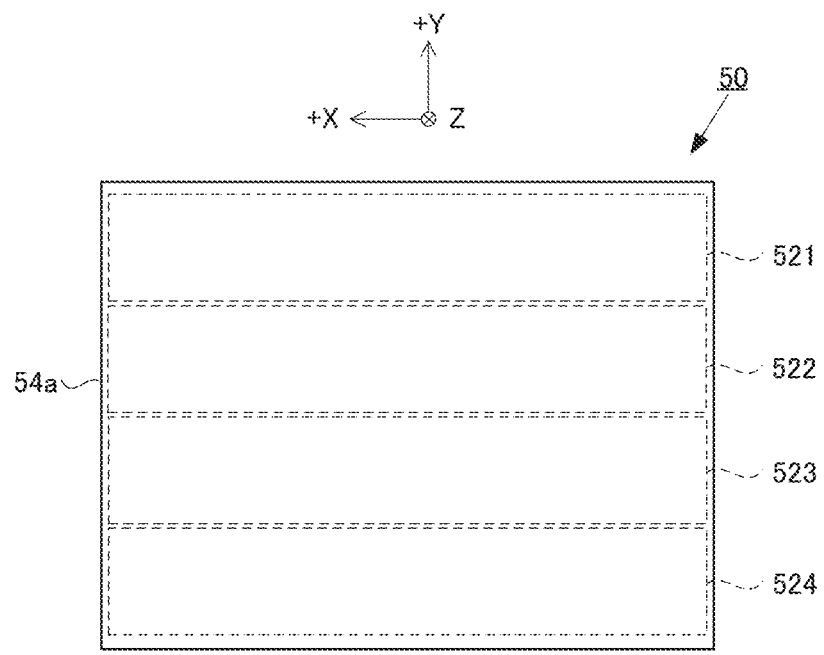
FIG. 13 is a plan view illustrating a polarization switching unit according to Embodiment 3.

As with the polarization switching unit 50 of Embodiment 1, the polarization switching unit 50 of the present embodiment is implemented as a TN liquid crystal element. As illustrated in FIG. 13, the polarization switching unit 50 of the present embodiment is divided into four regions, namely a first switching region 521 to a fourth switching region 524 that respectively correspond to the first emission region 311 to the fourth emission region 314 of the light source 32. The first switching region 521 to the fourth switching region 524 independently switch the polarization direction of the display light L1 between the X direction and the Y direction on the basis of switching signals suppled from the polarization switching driver 84 of the controller 80. Note that, in the present embodiment, the electrode 53 of the polarization switching unit 50 is divided into four electrodes in the line progressive scanning direction in order to supply the switching signals individually to the first switching region 521 to the fourth switching region 524.

As with the controller 80 of Embodiment 1, the controller 80 of the present embodiment includes a display driver 82, a polarization switching driver 84, and a light source driver 86. Additionally, the hardware configurations of the controller 80 of the present embodiment are the same as in Embodiment 1.

As with the display driver 82 of Embodiment 1, the display driver 82 of the present embodiment generates image signals from input signals, and supplies the generated image signals to the liquid crystal display panel 22. Furthermore, each time the display driver 82 supplies an image signal to each of the first display region 211 to the fourth display region 214, the display driver 82 supplies, to the polarization switching driver 84 and the light source driver 86, synchronization signals that synchronize with the start of the supplying of the image signals (the start timing at which writing of the image signal starts).

As with the polarization switching driver 84 of Embodiment 1, the polarization switching driver 84 of the present embodiment generates switching signals on the basis of the synchronization signals supplied from the display driver 82, and supplies the generated switching signals to the polarization switching unit 50. The polarization switching driver 84 of the present embodiment individually supplies switching signals to each of the first switching region 521 to the fourth switching region 524 of the polarization switching unit 50.

As with the light source driver 86 of Embodiment 1, the light source driver 86 of the present embodiment generates light source drive signals on the basis of the synchronization signals supplied from the display driver 82, and supplies the generated light source drive signals to the driver circuit 36 of the light source 32. The light source driver 86 of the present embodiment supplies a light source drive signal to the driver circuit 36 each time a different image is displayed in each of the first display region 211 to the fourth display region 214 of the liquid crystal display panel 22. As such, the driver circuit 36 causes the LED elements 34 to sequentially emit light at a light emission timing t300 by each of the first emission region 311 to the fourth emission region 314.

Figure 14:
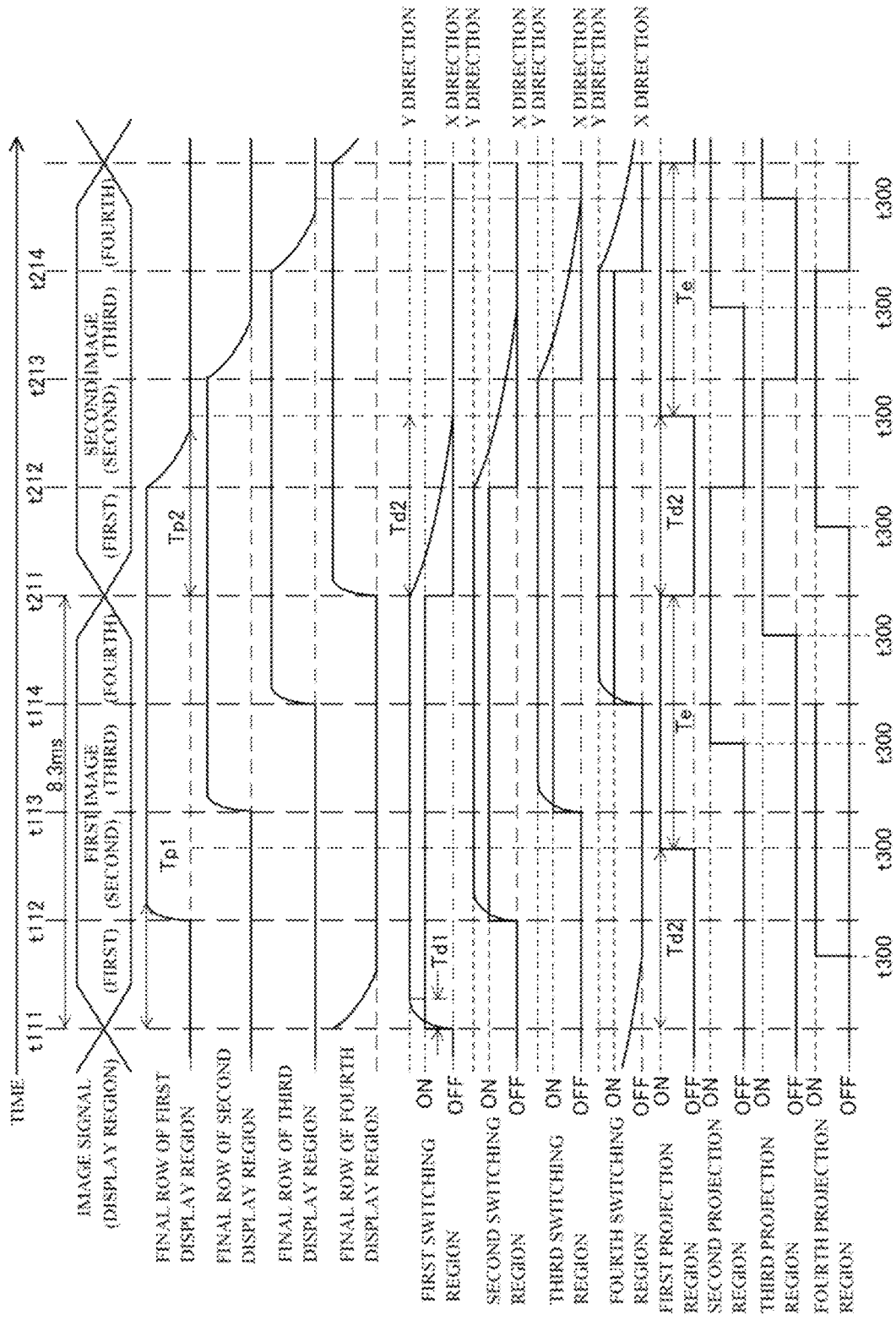
FIG. 14 is a drawing illustrating timings of operations of the three-dimensional-image display device according to Embodiment 3.

Next, the light emission timing t300 of the light source 32 of the present embodiment is described. FIG. 14 is a drawing illustrating timings of operations of the three-dimensional-image display device 10. In FIG. 14, the first tier illustrates the image signals (the first image signal and the second image signal) that are input into the liquid crystal display panel 22. The second tier to the fifth tier of FIG. 14 each illustrate the transmittance of the pixels P of the final row of the first display region 211 to the fourth display region 214 of the liquid crystal display panel 22. The sixth tier to the ninth tier of FIG. 14 each illustrate the timing of the switching signals and the polarization direction of the projected display light L2 in the first switching region 521 to the fourth switching region 524 of the polarization switching unit 50. The tenth tier to the thirteenth tier of FIG. 14 each illustrate timings of the light source drive signals of the first emission region 311 to the fourth emission region 314 of the light source 32.

In the present embodiment, the display driver 82 supplies the image signals to the liquid crystal display panel 22 on a 120 Hz cycle (period of one frame: 8.3 ms). The liquid crystal display panel 22 performs the line progressive scanning (the writing to the pixels P) on a 120 Hz cycle. In FIG. 14, writing of the first image to the first display region 211 starts from a timing t111. Writing of the second image to the first display region 211 starts from a timing t211. Writing of the first image to the second display region 212 starts from a timing t112. Writing of the second image to the second display region 212 starts from a timing t212. Writing of the first image to the third display region 213 starts from a timing t113. Writing of the second image to the third display region 213 starts from a timing t213. Writing of the first image to the fourth display region 214 starts from a timing t114. Writing of the second image to the fourth display region 214 starts from a timing t214.

In this case, to facilitate comprehension, an example of a light emission timing t300 is described using the first display region 211, the first switching region 521 and the first emission region 311.

In the first display region 211, the first image is written in a period from the timing t111 to the timing t112, and the second image is written in a period from the timing t211 to the timing t212. Accordingly, as illustrated in the second tier of FIG. 14, the transmittance of the pixels P of the final row of the first display region 211 changes from the timing t112 and the timing t212. Additionally, the timing t111 and the timing t211 correspond to start timings (different image start timings) at which the writing, in the first display region 211, of an image signal displaying a different image starts. In the following, the timing t111 and the timing t211 are respectively referred to as a "different image start timing t111" and a "different image start timing t211."

As illustrated in the sixth tier of FIG. 14, the polarization switching driver 84 of the present embodiment supplies, to the polarization switching unit 50, an ON level switching signal in the period from the different image start timing t111 to the different image start timing t211. From the different image start timing t111, the polarization direction of the display light L2 projected from the first switching region 521 switches from the X direction to the Y direction. Additionally, from the different image start timing t211, the polarization direction of the display light L2 projected from the first switching region 521 switches from the Y direction to the X direction.

The light source driver 86 of the present embodiment sets the light emission timing t300 of the first emission region 311 to timings at which an amount of time that ends latest after the different image start timings till and t211, among the switching of the polarization direction of the display light L2 of the first switching region 521, the response to the first image signal, and the response to the second image signal of the pixels P of the first display region 211, has elapsed from the different image start timings till and t211.

In the present embodiment, as illustrated in FIG. 14, the amount of time Td2, which is from the different image start timing t211 until the switching of the polarization direction of the display light L2 of the first switching region 521 ends, is the longest. Accordingly, as illustrated in the tenth tier of FIG. 14, the light source driver 86 of the present embodiment sets the light emission timing t300 of the first emission region 311 to timings at which the amount of time Td2 has elapsed from the different image start timings till and t211. Thus, the response of the pixels P of the final row of the first display region 211 ends, next, the polarization direction of the display light L2 of the first switching region 521 changes and, thereafter, light is emitted from the first emission region 311 of the light source 32. Accordingly, mixing of the first image displayed by the first image signal and the second image displayed by the second image signal can be prevented. Note that, in the present embodiment, the switching of the polarization direction of the display light L1 by the polarization switching unit 50 corresponds to switching of the focal distance for the display light L1 of the first image and the focal distance for the display light L1 of the second image of the variable focus lens unit 40.

The light source driver 86 of the present embodiment sets the emission periods Te of the first emission region 311 to from the light emission timing t300 to the next different image start timings till and t211. Thus, light is emitted in the first emission region 311 of the light source 32 from the light emission timings t300 to the different image start timings till and t211.

As with the first display region 211, the first switching region 521, and the first emission region 311, the light emission timing t300 and the emission period Te are also set in the second display region 212, the second switching region 522, and the second emission region 312, the third display region 213, the third switching region 523, and the third emission region 313, and the fourth display region 214, the fourth switching region 524, and the fourth emission region 314.

As described above, in the present embodiment, the light emission timings t300 of the first emission region 311 to the fourth emission region 314 of the light source 32 are respectively set on the basis of the different image start timings till to t214. Specifically, the light emission timings t300 are set to timings at which the amount of time Td2, for which the amount of time from the different image start timings till to t214 until the different image start timings t211 to t214 end is longest, has elapsed. As such, mixing of the first image and the second image can be prevented, and crosstalk between the first image and the second image can be suppressed.

Embodiment 4

In Embodiments 1 to 3, the variable focus lens unit 40 includes a polarization switching unit 50 and a polarized bifocal lens 60. A configuration is possible in which the variable focus lens unit 40 is implemented as a liquid crystal lens 600.

As with the three-dimensional-image display device 10 of Embodiment 1, the three-dimensional-image display device 10 of the present embodiment includes a display unit 20, a variable focus lens unit 40, and a controller 80. The configurations of the display unit 20 of the three-dimensional-image display device 10 of the present embodiment are the same as in the display unit 20 of Embodiment 1. Here, the variable focus lens unit 40, the controller 80, and the light emission timing t30 are described.

Figure 15:
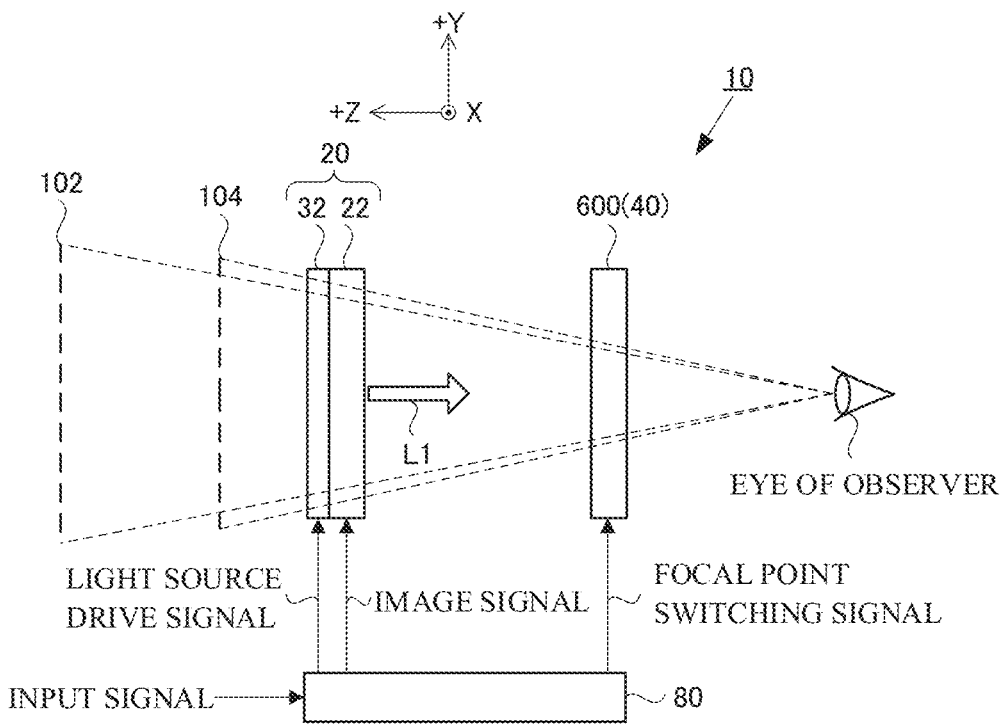
FIG. 15 is a schematic drawing illustrating a three-dimensional-image display device according to Embodiment 4.
Figure 16:
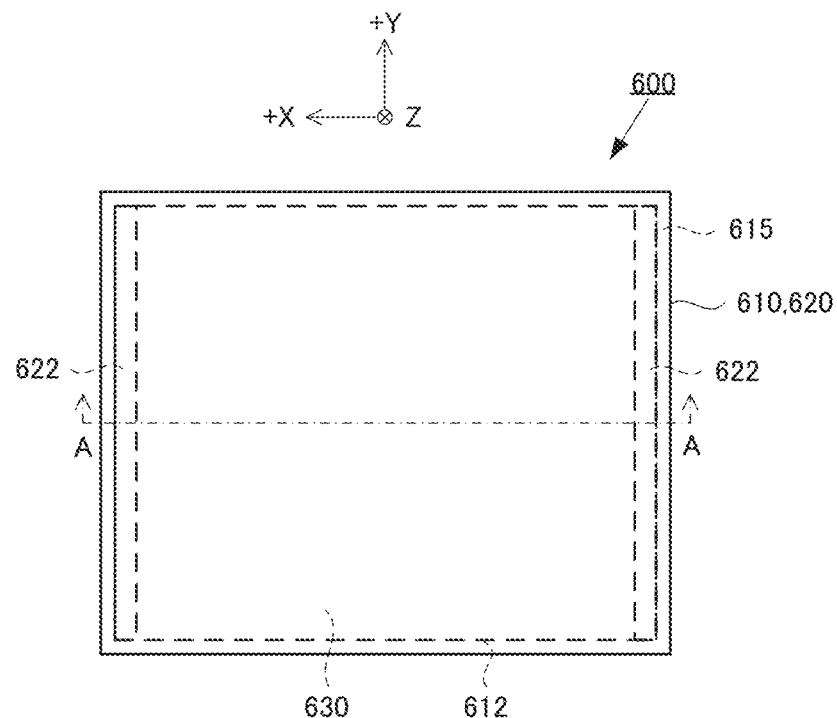
FIG. 16 is a plan view illustrating a liquid crystal lens according to Embodiment 4.
Figure 17:
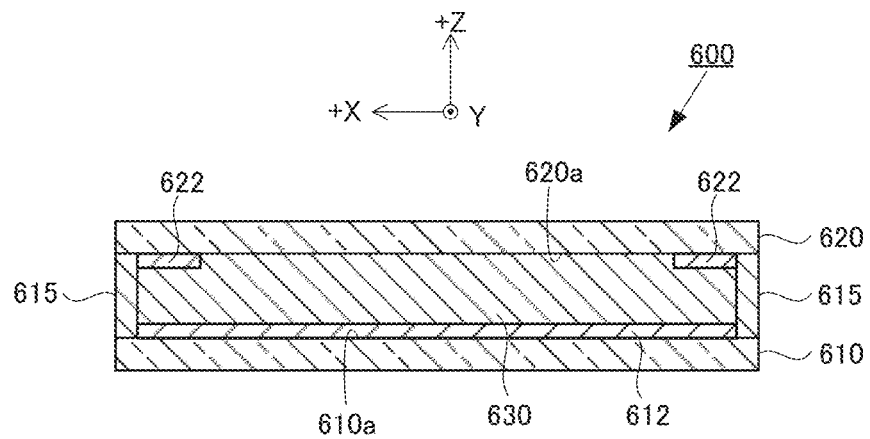
FIG. 17 is a cross-sectional view of the liquid crystal lens illustrated in FIG. 16, taken along line A-A.

As illustrated in FIG. 15, the variable focus lens unit 40 of the present embodiment is implemented as the liquid crystal lens 600. As a result of voltage being applied, the liquid crystal lens 600 changes the focal distance for polarized light having the predetermined first direction (the X direction) as the polarization direction, that is, the focal distance for the display light L1 projected from the display unit 20. Specifically, the liquid crystal lens 600 changes, on the basis of a switching signal that is supplied from the controller 80 and that is synchronized with the image signal, the focal distance for the display light L1 projected from the display unit 20. As a result of the liquid crystal lens 600 switching the focal distance for the display light L1 projected from the display unit 20, the first image is formed on the first display surface 102 when the first image is being displayed on the display unit 20 and the second image is formed on the second display surface 104 when the second image is being displayed on the display unit 20. As illustrated in FIGS. 16 and 17, the liquid crystal lens 600 includes a third light-transmitting substrate 610, a fourth light-transmitting substrate 620, and a liquid crystal 630.

In one example, the third light-transmitting substrate 610 is implemented as a flat glass substrate. The third light-transmitting substrate 610 and the fourth light-transmitting substrate 620 are adhered to each other by a sealing material 615. The third light-transmitting substrate 610 and the fourth light-transmitting substrate 620 sandwich the liquid crystal 630. The third light-transmitting substrate 610 includes a first electrode 612 and an alignment film (not illustrated).

The first electrode 612 of the third light-transmitting substrate 610 is formed in a rectangular shape on a first surface 610a of the third light-transmitting substrate 610. The first electrode 612 faces second electrodes 622 of the fourth light-transmitting substrate 620 (described later). The first electrode 612 is connected to the controller 80.

The alignment film of the third light-transmitting substrate 610 is provided on the first electrode 612. The alignment film aligns the liquid crystal 630 with the X direction. In one example, the alignment film is implemented as a polyimide alignment film that has been subjected to a rubbing treatment.

As with the third light-transmitting substrate 610, the fourth light-transmitting substrate 620 is implemented as a flat glass substrate. The fourth light-transmitting substrate 620 and the third light-transmitting substrate 610 are adhered to each other by the sealing material 615. The fourth light-transmitting substrate 620 and the third light-transmitting substrate 610 sandwich the liquid crystal 630. The fourth light-transmitting substrate 620 includes two second electrodes 622 and an alignment film (not illustrated).

The two second electrodes 622 of the fourth light-transmitting substrate 620 are respectively disposed on a +X side end and a −X side end of the first main surface 620a of the fourth light-transmitting substrate 620. Each of the second electrodes 622 extends in the Y direction and is connected to the controller 80.

The alignment film of the fourth light-transmitting substrate 620 is provided on the first main surface 620a and the second electrodes 622. As with the alignment film of the third light-transmitting substrate 610, the alignment film aligns the liquid crystal 630 with the X direction.

The liquid crystal 630 is implemented as a nematic liquid crystal that has positive dielectric anisotropy and positive refractive index anisotropy. When voltage is not applied, the liquid crystal 630 is aligned with the X direction.

When viewing an XZ cross-section of the liquid crystal lens 600, potential having a quadratic curve shape is formed between the two second electrodes 622 as a result of voltage being applied between the first electrode 612 and the second electrodes 622. The liquid crystal 630 is aligned along the formed quadratic curve-shaped potential. Due to the liquid crystal 630 being aligned along the quadratic curve-shaped potential, the liquid crystal lens 600 functions as a lens for the display light L1 projected from the display unit 20. The focal distance of the liquid crystal lens 600 is dependent on the value of the applied voltage.

In the present embodiment, when a predetermined first voltage is applied between the first electrode 612 and the second electrodes 622, the liquid crystal lens 600 switches the focal distance for the display light L1 to a first focal distance, thereby focusing the display light L1 of the first image on the first display surface 102. Additionally, when a predetermined second voltage (first voltage>second voltage) is applied between the first electrode 612 and the second electrodes 622, the liquid crystal lens 600 switches the focal distance for the display light L1 to a second focal distance, thereby focusing the display light L1 of the second image on the second display surface 104.

Figure 18:
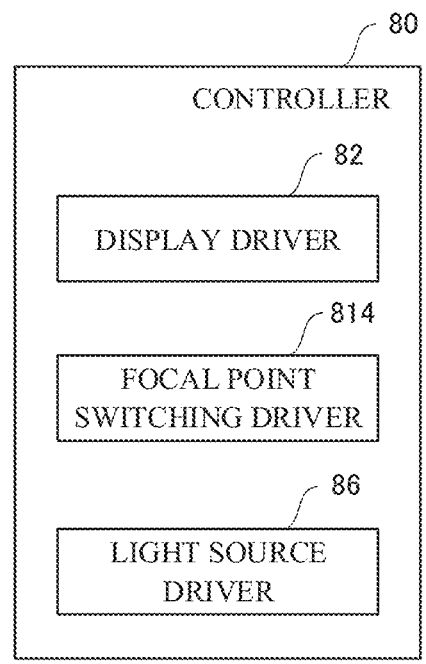
FIG. 18 is a block diagram illustrating a controller according to Embodiment 4.

The controller 80 of the present embodiment controls the display unit 20 and the liquid crystal lens 600 on the basis of input signals input from a non-illustrated external device. As illustrated in FIG. 18, the controller 80 includes a display driver 82, a focal point switching driver 814, and a light source driver 86. The configurations of the display driver 82 and the light source driver 86 of the present embodiment are the same as in Embodiment 1 and, as such, the focal point switching driver 814 is described.

The focal point switching driver 814 generates, on the basis of a synchronization signal supplied from the display driver 82, two types of focal point switching signals, namely a first focal point switching signal and a second focal point switching signal. Additionally, the polarization switching driver 84 supplies the focal point switching signals to the liquid crystal lens 600. In the present embodiment, when the first image is to be displayed on the liquid crystal display panel 22, the focal point switching driver 814 generates the first focal point switching signal (the first voltage), and supplies the first focal point switching signal to the liquid crystal lens 600. Additionally, when the second image is to be displayed on the liquid crystal display panel 22, the focal point switching driver 814 generates the second focal point switching signal (the second voltage), and supplies the second focal point switching signal to the liquid crystal lens 600.

Next, the light emission timing t30 of the light source 32 of the present embodiment is described. Here, differences from the timings in Embodiment 1 are mainly described.

Figure 19:
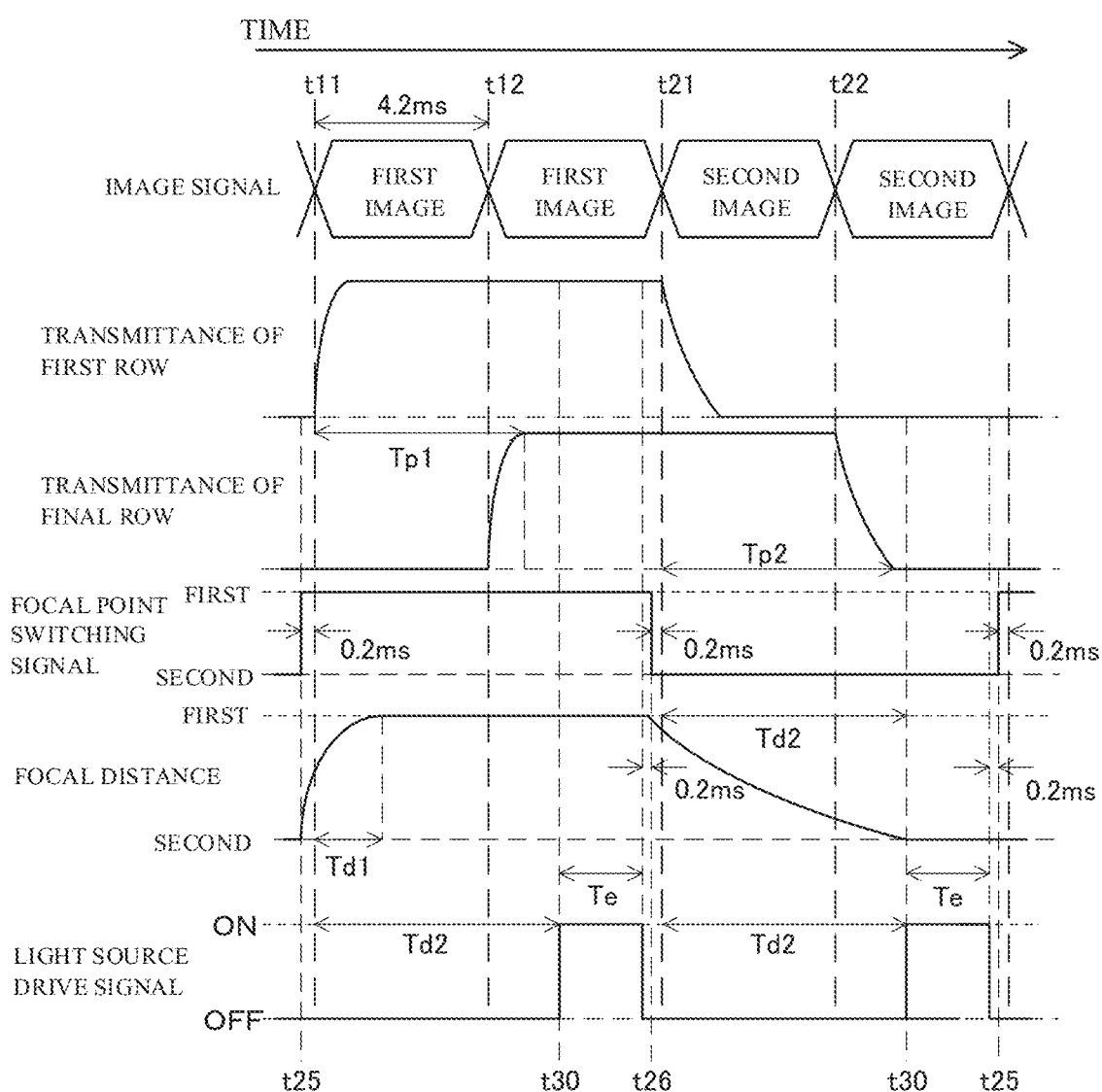
FIG. 19 is a drawing illustrating timings of operations of the three-dimensional-image display device according to Embodiment 4.

FIG. 19 illustrates timings of operations of the three-dimensional-image display device 10 of the present embodiment. In the present embodiment, as illustrated in the fourth tier of FIG. 19, the focal point switching driver 814 supplies the first focal point switching signal (the first voltage) to the liquid crystal lens 600 in a period from a timing t25 that is 0.2 ms before the timing t11 of the writing start of the first first image to a timing t26 that is 0.2 ms before the timing t21 of the writing start of the first second image. Additionally, the focal point switching driver 814 supplies the second focal point switching signal (the second voltage) to the liquid crystal lens 600 in a period from the timing t26 to the timing t25. As a result, as illustrated in the fifth tier of FIG. 19, from the timing t25, the focal distance of the liquid crystal lens 600 switches from the second focal distance to the first focal distance. Additionally, from the timing t26, the focal distance of the liquid crystal lens 600 changes from the first focal distance to the second focal distance.

In the present embodiment, as illustrated in FIG. 19, of the amounts of time Td1 and Td2 from the different image start timings t11 and t21 until the switching of the focal distance of the liquid crystal lens 600 ends, the amount of time Tp1 from the different image start timing t11 until the response to the first image signal of the pixels P of the liquid crystal display panel 22 ends, and the amount of time from Tp2 from the different image start timing t21 until the response to the second image signal of the pixels P of the liquid crystal display panel 22 ends, the amount of time Td2 is the longest. Accordingly, as illustrated in the sixth tier of FIG. 19, the light source driver 86 sets the light emission timing t30 to timings at which the amount of time Td2 has elapsed from the different image start timings t11 and t21. Note that the switching of the focal distance of the liquid crystal lens 600 corresponds to the switching of the focal distance for the display light L1 of the first image and the focal distance for the display light L1 of the second image of the variable focus lens unit 40.

In the present embodiment, the light emission timing t30 is set to timings at which the amount of time Td2 has elapsed from the different image start timings t11 and t21 and, as such, the focal distance (image forming position) for the display light L1 of the liquid crystal lens 600 is switched, next, the response to the pixels P of the final row of the liquid crystal display panel 22 ends and, thereafter, the light source 32 emits light. Accordingly, mixing of the first image and the second image can be prevented, and crosstalk between the first image and the second image can be suppressed. Additionally, in the present embodiment, by using the liquid crystal lens 600 for the variable focus lens unit 40, the need to separately provide the polarization switching unit 50 of Embodiments 1 to 3 is eliminated.

Embodiment 5

Figure 20:
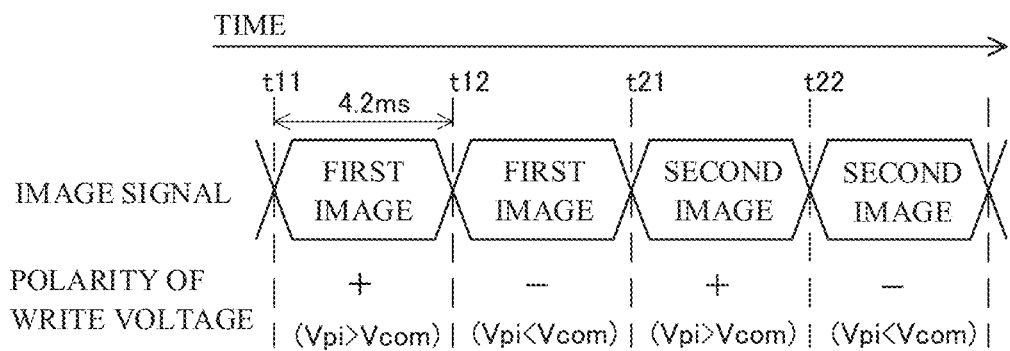
FIG. 20 is a drawing illustrating the polarity of write voltage of a pixel according to Embodiment 5.

In Embodiments 1, 2, and 4, the display driver 82 supplies the same image signal two consecutive times to liquid crystal display panel 22. That is, the display driver 82 consecutively writes the same image signal to the pixels P of the liquid crystal display panel 22. In this case, as illustrated in FIG. 20, it is preferable that the polarity of the voltage written to each of the pixels P is inverted at each writing. Such a configuration enables the suppression of image sticking of the liquid crystal display panel 22.

Figure 21:
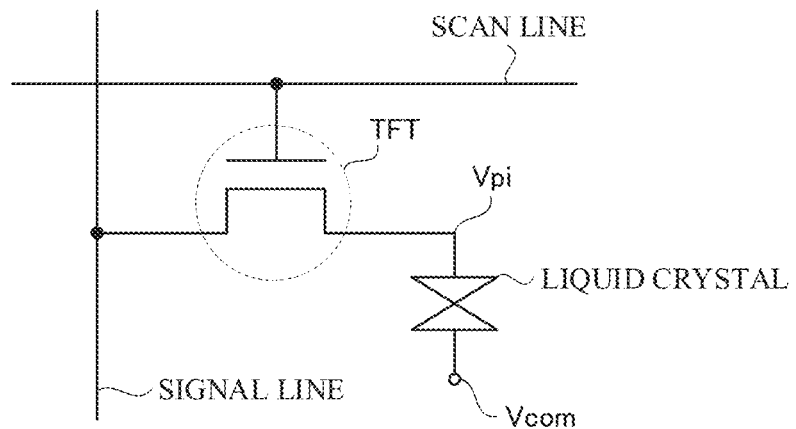
FIG. 21 is a schematic drawing illustrating a pixel circuit according to Embodiment 5.

Specifically, in the pixel circuit illustrated in FIG. 21, at each writing, the display driver 82 inverts the magnitude relationship between the common polarity potential Vcom of the liquid crystal display panel 22 and the potential Vpi on the TFT side of the liquid crystal display panel 22. As a result, as illustrated in FIG. 20, the polarity of the voltage written to the pixels P of the liquid crystal display panel 22 is inverted at each writing.

Figures 22A, 22B, 22C:
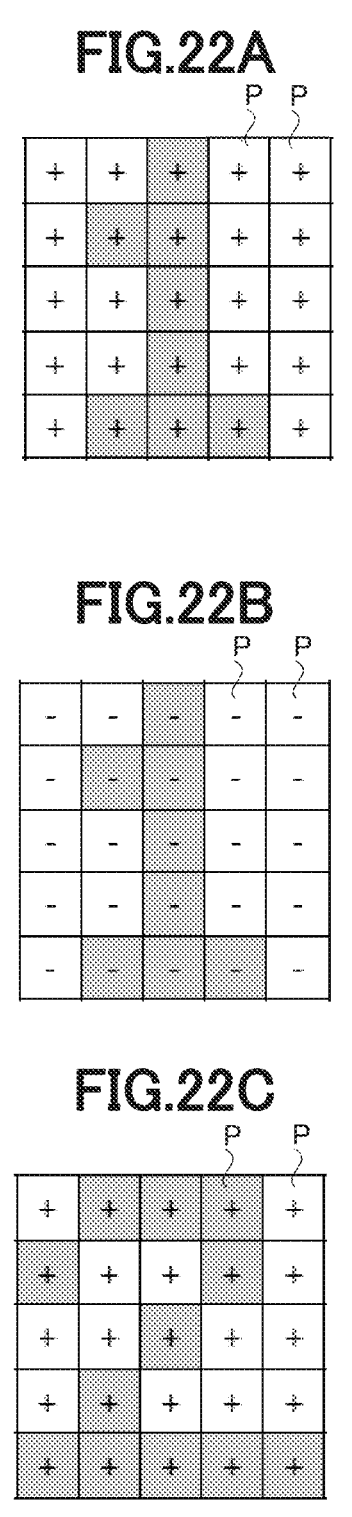
Figures 22D, 22E, 22F:
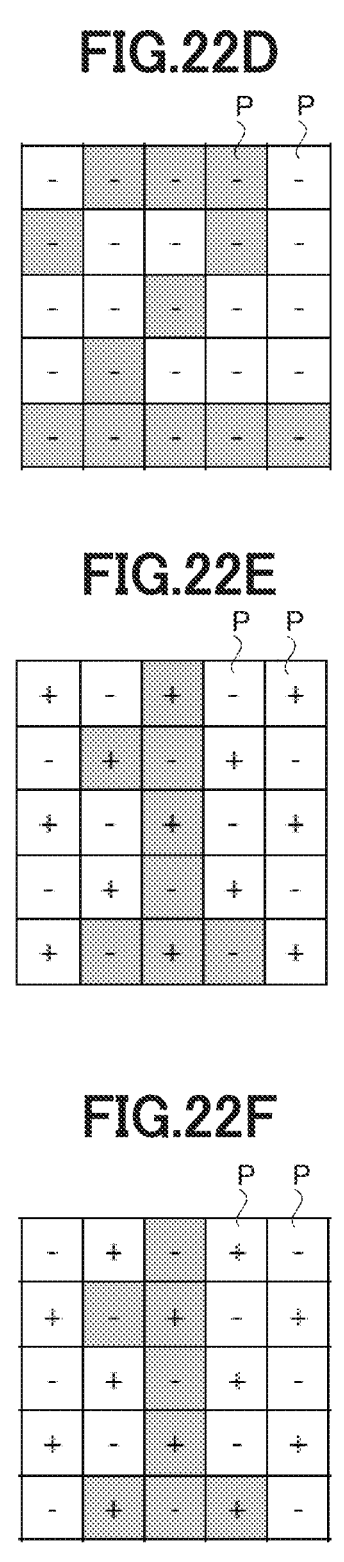
Figures 22G, 22H:
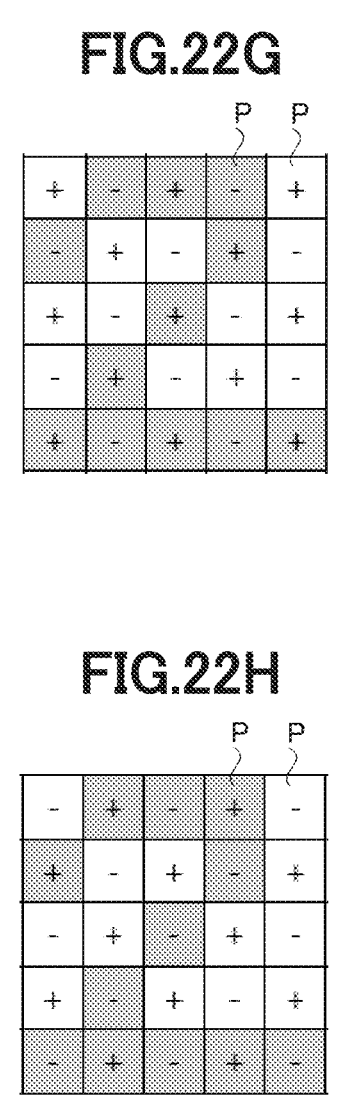

FIG. 22 illustrates examples of changes in the polarity of the voltage written to the pixels P when displaying the first image and the second image in FIG. 20. Here, the first image displays the numeral "1" and the second image displays the numeral "2." FIGS. 22A to 22D illustrate frame inversion driving in which all of the pixels are inverted with the same polarity. FIGS. 22E to 22H illustrate pixel inversion driving in which the polarities of adjacent pixels differ.

In a first frame that starts from t11 in FIG. 20, as illustrated in FIG. 22A, voltage for displaying the first image is written to each pixel P with + polarity. Then, in a second frame that starts from t12, as illustrated in FIG. 22B, voltage for displaying the first image is written to each pixel P with − polarity. Next, in a third frame that starts from t21, as illustrated in FIG. 22C, voltage for displaying the second image is written to each pixel P with + polarity. Next, in a fourth frame that starts from t22, as illustrated in FIG. 22D, voltage for displaying the second image is written to each pixel P with − polarity. Thus, frame inversion is carried out at each writing.

As another inversion driving, in the first frame that starts from t11 in FIG. 20, as illustrated in FIG. 22E, voltage for displaying the first image is written with polarities that differ for each adjacent pixel P. Then, in the second frame that starts from t12, as illustrated in FIG. 22F, voltage for displaying the first image is written by inverting the polarity of each pixel. Next, in the third frame that starts from t21, as illustrated in FIG. 22G, voltage for displaying the second image is written by inverting the polarity of each pixel from the second frame. Next, in the fourth frame that starts from t22, as illustrated in FIG. 22H, voltage for displaying the second image is written by inverting the polarity of each pixel from the third frame. Thus, pixel inversion is carried out at each writing.

In addition to the frame inversion and the pixel inversion, it is possible to apply, for example, scanning line inversion for inverting the polarity by row, signal line inversion for inverting the polarity by column, or the like.

MODIFIED EXAMPLES

Embodiments have been described, but various modifications can be made to the present disclosure without departing from the spirit and scope of the present disclosure.

Figure 23:
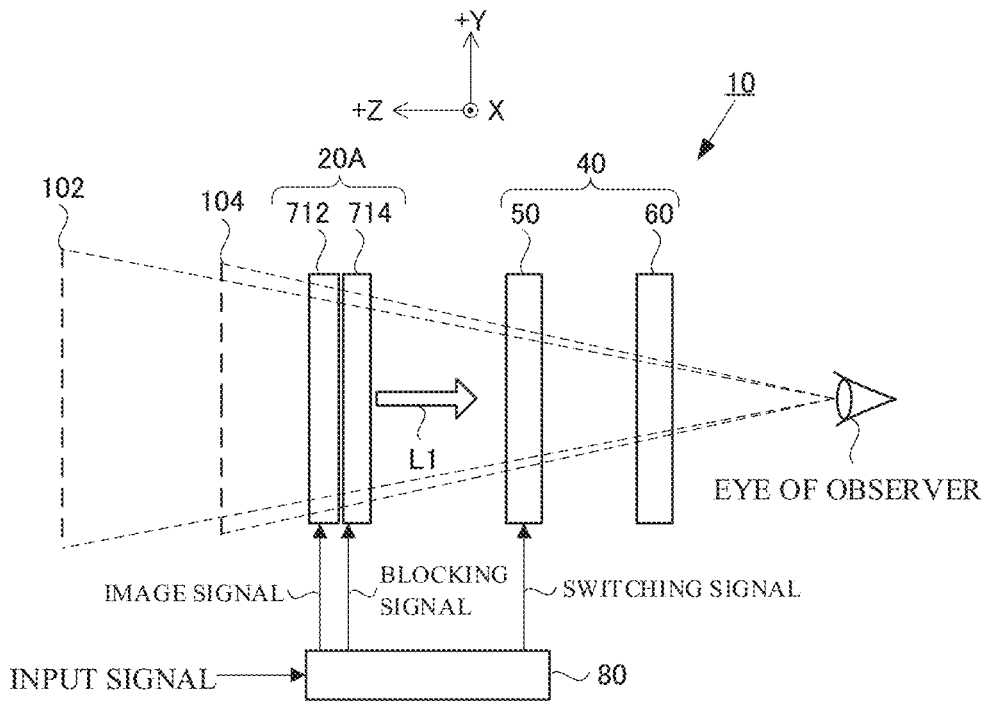
FIG. 23 is a schematic drawing illustrating a three-dimensional-image display device according to a modified example.

The display unit 20 of Embodiments 1 to 4 includes the liquid crystal display panel 22 and the light source 32, but the configuration of the display unit 20 is not limited thereto. For example, a configuration is possible in which, as illustrated in FIG. 23, instead of the display unit 20 that includes the liquid crystal display panel 22 and the light source 32, the three-dimensional-image display device 10 includes a display unit 20A including a light-emitting display panel 712 and a shutter 714. In one example, the light-emitting display panel 712 is implemented as an organic electro luminescence (EL) display panel that is active matrix driven by a TFT. The shutter 714 intermittently blocks light emitted from the light-emitting display panel 712. In one example, the shutter 714 is a liquid crystal shutter that operates in TN mode. In this case, instead of the light source drive signal, the controller 80 supplies a blocking signal to the shutter 714. The shutter 714 blocks the light emitted from the light-emitting display panel 712 on the basis of a blocking timing and a blocking period included in the blocking signal. That is, the controller 80 controls the blocking timing at which the shutter 714 blocks the light emitted from the light-emitting display panel 712, thereby controlling the projection timing at which the display unit 20 projects the display light L1.

Figure 24:
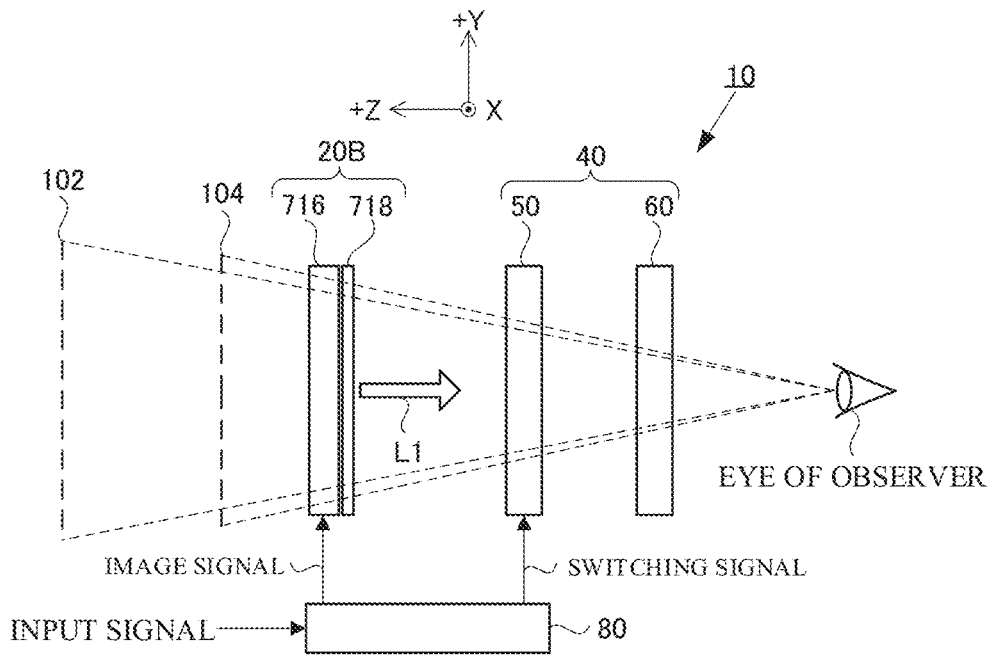
FIG. 24 is a schematic drawing illustrating a three-dimensional-image display device according to the modified example.

Additionally, a configuration is possible in which, as illustrated in FIG. 24, instead of the display unit 20 that includes the liquid crystal display panel 22 and the light source 32, the three-dimensional-image display device 10 includes a display unit 20B including a light-emitting display panel 716 and a polarizing plate 718. The light-emitting display panel 716 uses a known technique to emit light at the same timings as the light emission timings t30 and t300 of the light source 32 of Embodiments 1 to 3. The polarizing plate 718 projects the light projected from the light-emitting display panel 716 as the display light L1. The polarization direction of the display light L1 is the predetermined first direction.

In Embodiment 1, the light source 32 of the display unit 20 is implemented as a direct backlight, but the light source 32 is not limited to a direct backlight. For example, a configuration is possible in which the light source 32 of the display unit 20 is implemented as a side-edge backlight.

The polarization switching unit 50 is not limited to the TN liquid crystal element and the PLZT element. For example, a configuration is possible in which the polarization switching unit 50 is implemented as an element that uses the Faraday effect.

Furthermore, the variable focus lens unit 40 is not limited to the polarization switching unit 50 and the polarized bifocal lens 60, and the liquid crystal lens 600. A configuration is possible in which the variable focus lens unit 40 is implemented as a liquid lens in which the focal distance changes on the basis of voltage that is applied. For example, it is possible to use a liquid lens that uses electrowetting as the liquid lens. The liquid lens that uses electrowetting includes a conductive substrate covered with a layer that is insulating and hydrophobic, an insulating droplet deposited on the conductive substrate, and a conductive liquid that applies voltage to the insulating droplet. In the liquid lens that uses electrowetting, the shape of the insulating droplet changes due to the application of voltage to the insulating droplet by the conductive substrate and the conductive liquid. As a result, the focal distance of the liquid lens that uses electrowetting changes. Additionally, another example of a liquid lens is a liquid lens that includes a high-refractive liquid (refractive index: 1.4 to 1.7) and a polydimethylsiloxane (PDMS) film sandwiching the high-refractive liquid. In this case, the focal distance changes due to changes of the shape of the PDMS film.

In Embodiment 1, the polarization switching driver 84 supplies the ON level switching signal to the polarization switching unit 50 in the period from the timing t25 that is 0.2 ms before the different image start timing t11 to the timing t26 that is 0.2 ms before the different image start timing t21. The timings t25 and t26 are not limited to being 0.2 ms before the different image start timings t11 and t21. Additionally, the light source driver 86 sets the emission period Te to a period from the light emission timing t30 to 0.2 ms before the timings t25 and t26, but the emission period Te is not limited to being until 0.2 ms before the timings t25 and t26. Moreover, in Embodiment 4, the timings t25 and t26 are not limited to being 0.2 ms before the different image start timings t11 and t21.

In Embodiment 3, the liquid crystal display panel 22, the light source 32, and the polarization switching unit 50 are each divided into four regions, but the number of divided regions is not limited to four.

In Embodiment 3, a configuration is possible in which the liquid crystal lens 600 is provided instead of the polarization switching unit 50 and the polarized bifocal lens 60. In such a case, the liquid crystal lens 600 is divided into four variable regions respectively corresponding to the first emission region 311 to the fourth emission region 314 of the light source 32. Each of the variable regions independently switches the focal distance for the display light L1 on the basis of a switching signal supplied from the focal point switching driver 814. Note that, in order to independently supply a switching signal to each of the variable regions, the first electrode 612 and the second electrodes 622 are divided in the line progressive scanning direction.

In Embodiments 1 to 4, the phrase "until the response of the pixels P of the liquid crystal display panel 22 ends" refers to "until the transmittance or brightness of the pixels P reach 99% of a target value". The phrase "until the switching of the polarization direction of the display light L2 of the polarization switching unit 50 end" refers to "until the polarization direction of the display light L2 reach 99% of a target direction". It is sufficient that "until the response or the switching end" is "until the change amount of the transmittance, brightness, polarization direction, or the like decreases sufficiently". For example, when the polarization direction changes abruptly as with the polarization switching unit 50 of Embodiment 2, "until the switching of the polarization direction of the display light L2 of the polarization switching unit 50 end" may be defined as "until the polarization direction of the display light L2 reach 90% of a target direction".

Figure 25:
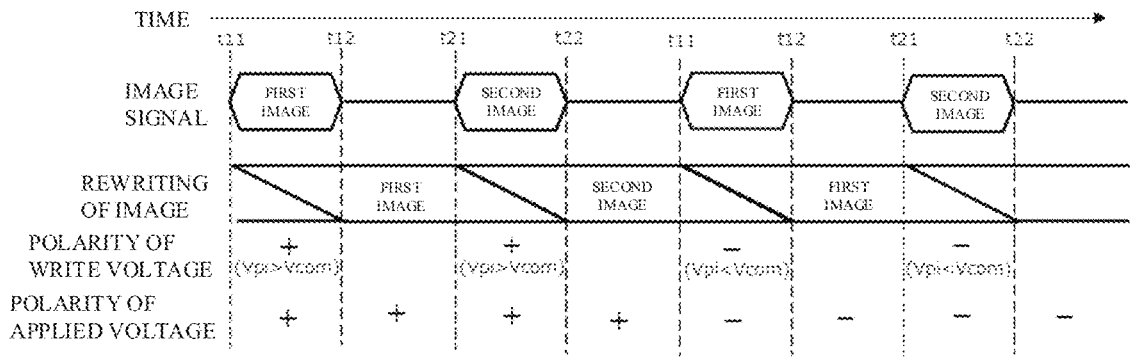
FIG. 25 is a drawing illustrating the polarity of voltage applied to pixels according to the modified example.

In Embodiment 5, the image signal of the same image is written two consecutive times to the pixels P of the liquid crystal display panel 22, and the polarity of the voltage written to the pixels P of the liquid crystal display panel 22 is inverted at the first writing and the second writing. As illustrated in FIG. 25, the present disclosure can be applied even in a case in which the first image and the second image are written every one time. Specifically, a configuration is possible in which, in a continuous display of the first image and the second image, the display driver 82 makes the polarity of the voltage written to the pixels P of the liquid crystal display panel 22 the same, and to display the next first image and second image, the display driver 82 inverts the polarity of the voltage written to the pixels P of the liquid crystal display panel 22.

Figure 26:
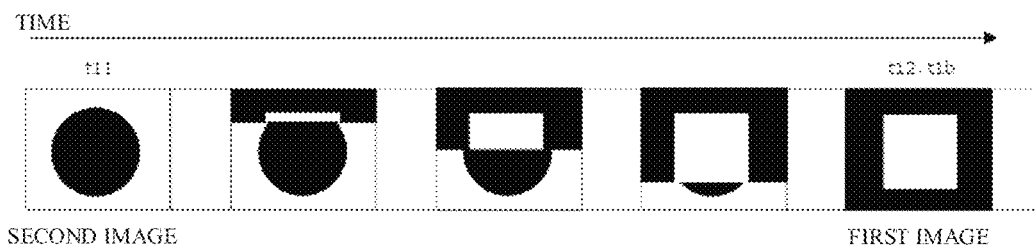
FIG. 26 is a drawing illustrating an example of rewriting of a displayed image according to the modified example.

FIG. 26 illustrates an example of rewriting of the images of FIG. 25. In this case, the pixels P are selected by row in a line sequential manner by the gate driver 23G, and the image to be displayed is rewritten in accordance with image signals. Specifically, when an image signal of the first image is written at t11 illustrated in FIG. 25, the second image illustrated by the circle in FIG. 26 is rewritten to the first image in a line sequential manner and, at the timing of t12, the display switches to the first image illustrated by the white rectangle in FIG. 26. FIG. 26 illustrates the period from t11 to t12, but the same operations are carried out for t21 to t22, with only the image to be rewritten being different. Note that, in FIG. 25, the same image is displayed over two frames, but it is sufficient that the same image is written for at least one frame.

Figure 27:
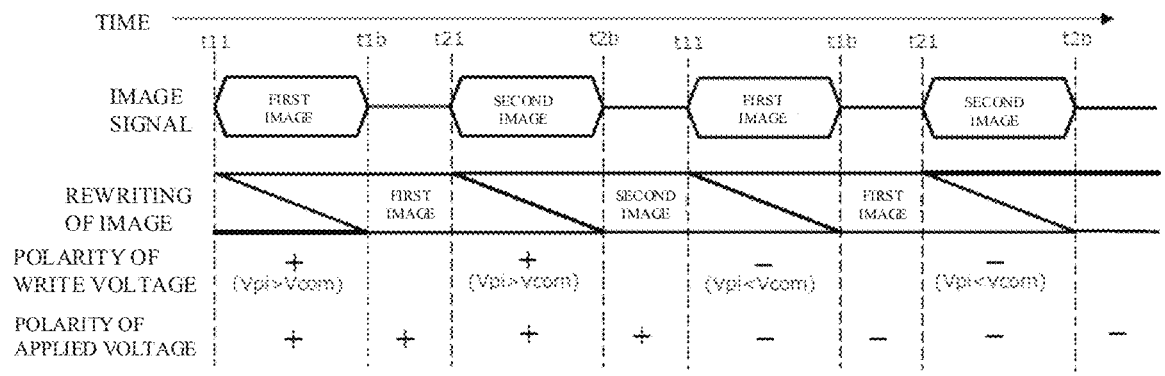
FIG. 27 is a drawing illustrating the polarity of voltage applied to a pixel according to another modified example.

FIG. 27 illustrates another example related to the polarity of the voltage that is applied to the pixels. In FIG. 27, a single-frame period t11-t21 consists of a writing period t11-t1b by an image signal, and a blanking period t1b-t21 in which there is no image signal within the single-frame period. Additionally, a subsequent single-frame period t21-t11 consists of a writing period t21-t2b by an image signal, and a blanking period t2b-t11. In this case as well, voltage of the same polarity as in FIG. 25 can be applied to the pixels P. Additionally, in the examples illustrated in FIGS. 25 and 27 as well, it is possible to apply inversion driving such as the frame inversion and the pixel inversion illustrated in FIG. 22, scanning line inversion, signal line inversion, and the like.

When using the three-dimensional-image display device 10 in a head-mounted display, a configuration is possible in which the three-dimensional-image display device 10 includes a right-eye variable focus lens unit 40 and a left-eye variable focus lens unit 40. Additionally, a configuration is possible in which the head-mounted display includes a right-eye three-dimensional-image display device 10 and a left-eye three-dimensional-image display device 10.

In each embodiment, an example of a three-dimensional-image display device 10 using a monochrome liquid crystal panel is described, but a configuration is possible in which a color liquid crystal panel is be used instead of the monochrome liquid crystal panel. In such a case, the pixels P can be configured as subpixels that are color-divided into red (R), green (G), blue (B), or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A three-dimensional-image display device comprising:
   a display unit that sequentially displays a first image displayed by a first image signal and a second image displayed by a second image signal, and that projects a display light of the first image and a display light of the second image;
   a variable focus lens unit that switches between a focal distance for the display light of the first image and a focal distance for the display light of the second image; and
   a controller that controls a projection timing at which the display unit projects the display light of the first image and a projection timing at which the display unit projects the display light of the second image, wherein
   the first image and the second image are two-dimensional images obtained by projecting a display subject from a side of an observer on each of a first display surface and a second display surface that are positioned at different positions in a depth direction from a perspective of the observer,
   the variable focus lens unit forms each of the first image and the second image as a virtual image on each of the first display surface and the second display surface,
   the controller controls the projection timing at which the display unit projects the display light of the second image, based on a start timing at which writing, of the second image signal, to pixels of the display unit starts,
   the variable focus lens unit is a liquid crystal lens that includes a liquid crystal, a first substrate and a second substrate sandwiching the liquid crystal, and electrodes to apply voltage to the liquid crystal, and that changes, due to the voltage applied on the liquid crystal, the focal distance for the display light of the first image and the focal distance for the display light of the second image,
   the controller supplies, to the display unit, the first image signal and the second image signal, and controls the focal distance for the display light of the first image and the focal distance for the display light of the second image of the variable focus lens unit, and
   the controller sets, as the projection timing at which the display unit projects the display light of the second image, a timing at which an amount of time that ends latest after the start timing, among a switching of the focal distance for the display light of the first image and the focal distance for the display light of the second image, a response to the first image signal of the pixels of the display unit, and a response to the second image signal of the pixels of the display unit, has elapsed from the start timing such that
   a response of pixels of a final row of the display unit and a switching of the focal distance of the variable focus lens unit end, after which the display unit projects the display light of the first image and the display light of the second image, thereby suppressing a crosstalk between the first image and the second image.

2. The three-dimensional-image display device according to claim 1, wherein
   the display unit displays the first image and the second image by line progressive scanning, and sequentially projects each of the display light of the first image and the display light of the second image in each of a plurality of projection regions divided in a direction of the line progressive scanning,
   the liquid crystal lens includes a plurality of variable regions that correspond to each of the plurality of projection regions and that change the focal distance for the display light of the first image and the focal distance for the display light of the second image, and
   the controller controls the projection timing at which the display unit projects the display light of the second image for each of the projection regions based on the start timing for each of the projection regions.

3. The three-dimensional-image display device according to claim 1, wherein
   the display unit includes a light source that emits light, and a liquid crystal display panel that modulates the light emitted by the light source to display the first image and the second image,
   the first image signal and the second image signal are written to the liquid crystal display panel, and
   the controller controls the projection timing at which the display unit projects the display light of the second image by controlling an emission timing at which the light source emits the light.

4. The three-dimensional-image display device according to claim 3, wherein when the first image signal for displaying the first image or the second image signal for displaying the second image is continuously written to the pixels of the liquid crystal display panel, a polarity of a voltage written to each of the pixels of the liquid crystal display panel is inverted at each writing.

5. The three-dimensional-image display device according to claim 3, wherein
   when the first image and the second image are written every one time,
   in a display of the continuous first image and the second image, a polarity of a voltage written to the pixels of the liquid crystal display panel is identical for the first image and the second image and, also, when displaying the next first image and the second image, the polarity of the voltage written to the pixels of the liquid crystal display panel is inverted.

6. The three-dimensional-image display device according to claim 1, wherein
   the display unit includes a light-emitting display panel that displays the first image and the second image, and a shutter that blocks light emitted from the light-emitting display panel,
   the first image signal and the second image signal are written to the light-emitting display panel, and
   the controller controls the projection timing at which the display unit projects the display light of the second image by controlling a blocking timing at which the shutter blocks the light emitted from the light-emitting display panel.

\* \* \* \* \*